(12) United States Patent
Anderson et al.

(10) Patent No.: US 10,577,191 B2
(45) Date of Patent: Mar. 3, 2020

(54) CONVEYOR ARTICLE MANAGEMENT SYSTEM

(71) Applicant: Intelligrated Headquarters, LLC, Mason, OH (US)

(72) Inventors: Christopher Scott Anderson, Lawrenceburg, IN (US); Timothy Williams, Mason, OH (US); Brian Resnick, Mason, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 54 days.

(21) Appl. No.: 16/016,097

(22) Filed: Jun. 22, 2018

(65) Prior Publication Data

US 2019/0389670 A1 Dec. 26, 2019

(51) Int. Cl.
*B65G 47/31* (2006.01)
*B65G 43/10* (2006.01)
*B65G 47/52* (2006.01)
*B65G 37/00* (2006.01)

(52) U.S. Cl.
CPC ............ *B65G 47/31* (2013.01); *B65G 37/00* (2013.01); *B65G 43/10* (2013.01); *B65G 47/52* (2013.01); *B65G 2203/0208* (2013.01); *B65G 2811/0631* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,267,638 | A * | 12/1993 | Doane | B65G 43/08 198/357 |
| 5,954,330 | A | 9/1999 | Rabindran et al. | |
| 6,129,199 | A * | 10/2000 | Gretener | B65G 47/31 198/357 |
| 6,244,421 | B1 * | 6/2001 | Hall | B65G 43/08 198/460.1 |
| 6,923,307 | B2 | 8/2005 | Haan et al. | |
| 7,909,155 | B2 | 3/2011 | Lupton et al. | |
| 2009/0065330 | A1 * | 3/2009 | Lupton | B65G 43/08 198/357 |
| 2011/0048894 | A1 * | 3/2011 | Doane | B65G 43/08 198/460.1 |

(Continued)

FOREIGN PATENT DOCUMENTS

WO WO-99/41169 8/1999

*Primary Examiner* — Kyle O Logan
(74) *Attorney, Agent, or Firm* — Alston & Bird LLP

(57) ABSTRACT

Various embodiments described herein relate to a method of predicting article dimensions and controlling release timing of upcoming articles from upstream conveyors and dynamically computing release times for the upstream conveyors. The method includes predicting a dimension of an upcoming article and creating empty spaces on an upstream conveyor between one or more upstream articles from among a set of upstream articles by controlling an operating speed of a set of drive motors of the upstream conveyor based on the predicted dimension for the upcoming article. Further, the release times of the set of upstream articles is dynamically computed based on a cumulative length of the set of upstream articles and an operating speed of the upstream conveyor.

20 Claims, 11 Drawing Sheets

(56) References Cited

U.S. PATENT DOCUMENTS

| | | | | |
|---|---|---|---|---|
| 2012/0175223 | A1* | 7/2012 | Breen | B65G 43/10 |
| | | | | 198/459.8 |
| 2014/0142747 | A1* | 5/2014 | Magato | B65G 43/08 |
| | | | | 700/230 |
| 2014/0202935 | A1* | 7/2014 | Joplin | B21B 41/00 |
| | | | | 209/523 |
| 2015/0151923 | A1* | 6/2015 | Dent | G06Q 50/24 |
| | | | | 700/226 |

* cited by examiner

CONVEYOR ARTICLE MANAGEMENT SYSTEM

TECHNICAL FIELD

The present disclosure generally relates to a material handling system, and, more specifically, relates to controlling the release of articles on conveyors in a material handling system.

BACKGROUND

Conventionally, in material handling environments, multiple conveyors are arranged for transporting articles from one place to another. These articles may be consumer goods, packaged boxes, cases, items, cartons, and/or the like that are to be transported on such conveyors from a source location to a destination location. For example, the source location may be a warehouse, an inbound container dock, a pickup area, an inventory, a storage facility, or another conveyor. The destination location may be, for example, a cubby, a pallet, a put wall, a staging area, or an outbound container dock. In such material handling environments, some of the conveyors transporting the articles are feed conveyors (e.g., upstream conveyors), while some of the conveyors are takeaway conveyors (e.g., downstream conveyors.) The upstream conveyors may feed articles from the source location to the downstream conveyors, and, upon receiving articles from the upstream conveyors, the downstream conveyors may feed the articles at the destination location (e.g., into discharge chutes or into another conveyor). Accordingly, in material handling systems, multiple upstream conveyors merge to one or more downstream conveyors for transporting articles from the source location to the destination location.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

BRIEF SUMMARY

Figure 1:
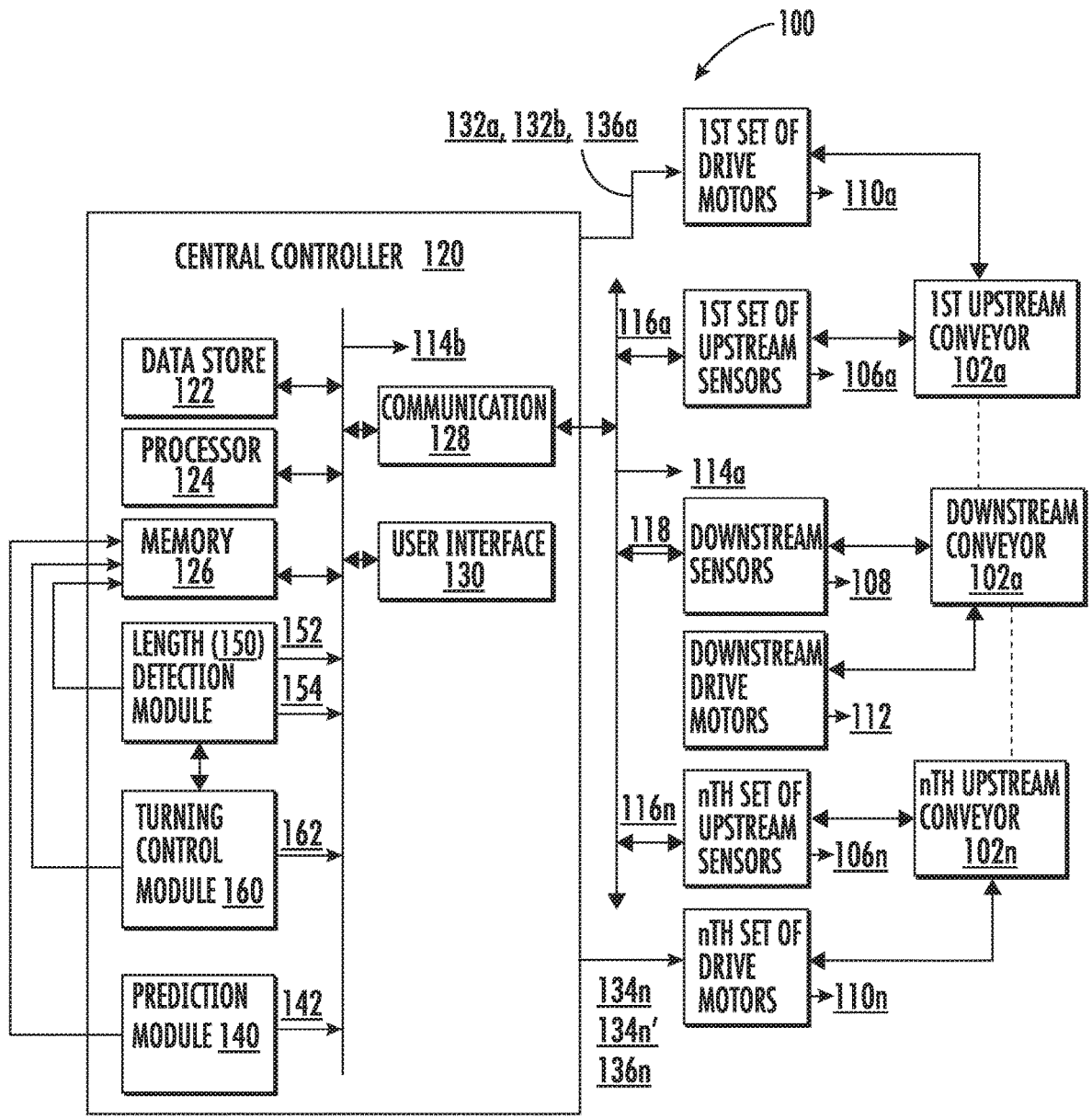
FIG. 1 illustrates a schematic block diagram of material handling system according to an embodiment.

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

Various aspects described herein relate to a method for managing a release of articles from upstream conveyors. The method includes recording a dimension of each article in a second set of upstream articles travelling past one or more upstream sensors on a second upstream conveyor in order to create an historical log of the dimensions of each article in the second set of upstream articles. Further, the method includes predicting a dimension of an upcoming article arriving at the second upstream conveyor by performing computations based on the historical log of the recorded dimensions of the second set of upstream articles. After predicting the dimension of the upcoming article, creating one or more empty spaces on a first upstream conveyor between one or more upstream articles from among a first set of upstream articles by controlling an operating speed of a first set of drive motors of the first upstream conveyor based on the predicted dimension for the upcoming article. The dimension of the one or more empty spaces is greater than or equal to the predicted dimension of the upcoming article. After creation of empty spaces, the method includes releasing the first set of upstream articles on the first upstream conveyor with the one or more created empty spaces on to a downstream conveyor. Further, subsequent to releasing the first set of upstream articles, the method includes releasing the upcoming article from the second upstream conveyor on to the downstream conveyor by controlling an operating speed of a second set of drive motors such that the upcoming article is placed in one or more of the empty spaces created between the one or more upstream articles released on to the downstream conveyor.

In some instances, the method further includes receiving an interrupt input signal from the one or more upstream sensors of the second upstream conveyor, wherein the interrupt input signal indicates arrival of a new article having a dimension determined to be greater than the predicted dimension of the upcoming article. The method further includes controlling the operating speed of the first set of drive motors to create additional empty space between the first set of upstream articles on the first upstream conveyor based on a determined dimension of the random article. The dimension of the additional empty space is greater than or equal to the determined dimension for the random article. The dimension of the additional empty spaces is greater than or equal to the determined dimension for the random article.

Various aspects described herein relate to managing a release of articles from upstream conveyors wherein the upcoming article defines a subset of the second set of upstream articles waiting to travel past the one or more upstream sensors of the second upstream conveyor.

Various aspects described herein relate to a method for managing release of articles from upstream conveyors, wherein the dimension comprises one of a length value or a width value of the second set of upstream articles. In some cases, the method includes creating an historical log in a memory of at least last three articles released from the second upstream conveyor, wherein the historical log includes a length of each of the last three articles sensed by the one or more upstream sensors, and wherein the historical log is stored in the form of a look-up table in the memory. The method further includes updating the historical log in the memory periodically to remove stale information from the historical log, wherein the stale information corresponds to a first entry in the look-up table containing information of an oldest article released from the second upstream conveyor. The method further includes obtaining the article having largest length value from among the last three articles released from the second upstream conveyor and recorded in the historical log and rounding the largest length value to a nearest whole number. After obtaining the article having largest length, updating the rounded length value as predicted length for the upcoming article at the second upstream conveyor.

In some embodiments, the method includes creating an historical log in a memory of at least last three articles released from the second upstream conveyor, wherein the historical log includes a length of the each of the last three articles sensed by the one or more upstream sensors, and wherein the historical log is stored in the form of a look-up table in the memory. The method further includes updating the historical log in the memory periodically to remove stale information from the historical log, wherein the stale information corresponds to a first entry in the look-up table containing information of an oldest article released from the second upstream conveyor. The method further includes obtaining the article having largest length value from among the last three articles released from the second upstream conveyor and recorded in the historical log and rounding the largest length value to a nearest whole number. The method further includes adding a predetermined length value to the rounded length value to obtain the predicted length for the upcoming article at the second upstream conveyor.

In other embodiments, the method includes creating an historical log in a memory of at least last three articles released from the second upstream conveyor, wherein the historical log includes a length of each of the last three articles sensed by the one or more upstream sensors, and wherein the historical log is stored in the form of a look-up table in the memory. The method further includes updating the historical log in the memory periodically to remove stale information from the historical log, wherein the stale information corresponds to a first entry in the look-up table containing information of an oldest article released from the second upstream conveyor. The method further includes obtaining the average length value of the last three articles released from the second upstream conveyor and recorded in the historical log and rounding the average length value to the nearest whole number. After obtaining average length value, updating the rounded length value as predicted length for the upcoming article at the second upstream conveyor The method may include creating an historical log in a memory of at least last three articles released from the second upstream conveyor, wherein the historical log includes a length of the each of the last three articles sensed by the one or more upstream sensors, and wherein the historical log is stored in the form of a look-up table in the memory. The method further includes updating the historical log in the memory periodically to remove stale information from the historical log, wherein the stale information corresponds to a first entry in the look-up table containing information of an oldest article released from the second upstream conveyor. The method further includes obtaining the average length value of the last three articles released from the second upstream conveyor and recorded in the historical log and rounding the average length value to the nearest whole number. After obtaining average length value, adding the predetermined length value to the rounded average length value to obtain the predicted length for the upcoming article at the second upstream conveyor.

In some cases, the method includes monitoring the length value of the articles released from the second upstream conveyor to the downstream conveyor, wherein when a decreasing trend in the length value of the articles is encountered and obtaining a minimum length value from the monitored length value, wherein the minimum length value is determined based on a frequency of occurrence of the minimum length value over a period of time. If a decreasing trend in the length value of the articles is encountered, setting the minimum length value as an acceptable minimum limit and adding the predetermined length value to the minimum length value to obtain the predicted length of the upcoming article at the second upstream conveyor.

In some embodiments, the method includes creating an historical log in a memory of at least last three articles released from the second upstream conveyor, wherein the historical log includes a length of the each of the last three articles sensed by the one or more upstream sensors, and wherein the historical log is stored in the form of a look-up table in the memory. The method further includes updating the historical log in the memory periodically to remove stale information from the historical log, wherein the stale information corresponds to a first entry in the look-up table containing information of an oldest article released from the second upstream conveyor. The method further includes obtaining the average length value of the last three articles released from the second upstream conveyor and recorded in the historical log and rounding the average length value to the nearest whole number. The method further includes adding the predetermined length value to the rounded length value to obtain the predicted length for the upcoming article at the first upstream conveyor, wherein when the predicted length is less than the acceptable minimum limit, then, setting the predicted length to the acceptable minimum limit.

Various aspects described herein relate to managing release of articles from upstream conveyors, wherein the stale information is an information exceeding a timing threshold, and wherein the timing threshold being a maximum time beyond which the recorded information in the historical log may be discarded during a calculation or prediction of the dimension of the upcoming article.

Various aspects described herein relate to managing release of articles from upstream conveyors, wherein updating the historical log in the memory periodically further comprises refreshing the historical log to include entries in the look-up table corresponding to latest released articles from the second upstream conveyor.

Various aspects described herein, relates to, a controller for managing release of articles from upstream conveyors. The controller includes a processor, and a memory. The processor is coupled to the memory and is configured to record a dimension of each article in a second set of upstream articles travelling past one or more upstream sensors on a second upstream conveyor in order to create an historical log of the dimensions of each article in the second set of upstream articles. After recording the dimensions, the controller predict a dimension of an upcoming article arriving at the second upstream conveyor by performing computations based on the historical log of the recorded dimensions of the second set of upstream articles. Further, the controller is configured to create one or more empty spaces on a first upstream conveyor between one or more upstream articles from among a first set of upstream articles by controlling an operating speed of a first set of drive motors of the first upstream conveyor based on the predicted dimension for the upcoming article; wherein the dimension of the one or more empty spaces is greater than or equal to the predicted dimension of the upcoming article. After creating the empty spaces, the controller releases the first set of upstream articles on the first upstream conveyor with the one or more created empty spaces on to a downstream conveyor. Subsequent to the release of the first set of upstream articles, the controller releases the upcoming article from the second upstream conveyor on to the downstream conveyor by controlling an operating speed of a second set of drive motors such that the upcoming article is placed in one or more of the empty spaces created between the one or more upstream articles released on to the downstream conveyor.

In some embodiments, the controller is configured to monitor length value of the articles released from the second upstream conveyor to the downstream conveyor, wherein when a decreasing trend in the length value of the articles is encountered. When the controller encounters a decreasing trend in the length value of the articles, it obtain a minimum length value from the monitored length value, wherein the minimum length value is determined based on a frequency of occurrence of the minimum length value over a period of time. Further, the controller sets the minimum length value as an acceptable minimum limit and adds the predetermined length value to the minimum length value to obtain the predicted length of the upcoming article at the second upstream conveyor.

Various aspects described herein, relates to, a controller for managing release of articles from upstream conveyors. The controller is further configured to: receive an interrupt input signal from the one or more upstream sensors of the second upstream conveyor, wherein the interrupt input signal indicates arrival of a new article having a dimension determined to be greater than the predicted dimension of the upcoming article. Further, the controller is configured to control the operating speed of the first set of drive motors to create additional empty space between the first set of upstream articles on the first upstream conveyor based on a determined dimension of the random article, wherein a dimension of the additional empty space is greater than or equal to the determined dimension for the random article. The controller is configured to create an historical log in a memory of at least last three articles released from the second upstream conveyor, wherein the historical log includes a length of the each of the last three articles sensed by the one or more upstream sensors. The historical log is stored in the form of a look-up table in the memory. The controller updates the historical log in the memory periodically to remove stale information from the historical log, wherein the stale information corresponds to a first entry in the look-up table containing information of an oldest article released from the second upstream conveyor. After accessing the historical log, the controller is configured to obtain the article having largest length value from among the last three articles released from the second upstream conveyor and recorded in the historical log and rounding the largest length value to the nearest whole number. After obtaining the largest length value, the controller adds the predetermined length value to the rounded length value to obtain the predicted length for the upcoming article at the first upstream conveyor, wherein when the predicted length is less than the acceptable minimum limit, then, setting the predicted length to the acceptable minimum limit.

In some embodiments, the controller is configured to create an historical log in a memory of at least last three articles released from the second upstream conveyor, wherein the historical log includes a length of the each of the last three articles sensed by the one or more upstream sensors. The historical log is stored in the form of a look-up table in the memory. The controller updates the historical log in the memory periodically to remove stale information from the historical log, wherein the stale information corresponds to a first entry in the look-up table containing information of an oldest article released from the second upstream conveyor. The controller is further configured to obtain the average length value of the last three articles released from the second upstream conveyor and recorded in the historical log and rounding the average length value to the nearest whole number and adds the predetermined length value to the rounded average length value to obtain the predicted length for the upcoming article at the second upstream conveyor.

Various aspects described herein, relates to, a material handling system for managing release of articles from upstream conveyors. The material handling system includes a first upstream conveyor, a second upstream conveyor, a downstream conveyor, and a controller communicably coupled to upstream sensors installed on the first upstream conveyor and the second upstream conveyor. The controller is configured to record a dimension of each article in a second set of upstream articles travelling past one or more upstream sensors on a second upstream conveyor in order to create an historical log of the dimensions of each article in the second set of upstream articles. After recording the dimensions, the controller predict a dimension of an upcoming article arriving at the second upstream conveyor by performing computations based on the historical log of the recorded dimensions of the second set of upstream articles. Further, the controller is configured to create one or more empty spaces on a first upstream conveyor between one or more upstream articles from among a first set of upstream articles by controlling an operating speed of a first set of drive motors of the first upstream conveyor based on the predicted dimension for the upcoming article; wherein the dimension of the one or more empty spaces is greater than or equal to the predicted dimension of the upcoming article. After creating the empty spaces, the controller releases the first set of upstream articles on the first upstream conveyor with the one or more created empty spaces on to a downstream conveyor. Subsequent to the release of the first set of upstream articles, the controller releases the upcoming article from the second upstream conveyor on to the downstream conveyor by controlling an operating speed of a second set of drive motors such that the upcoming article is placed in one or more of the empty spaces created between the one or more upstream articles released on to the downstream conveyor.

In some cases, the material handling system including the upstream sensors of the second upstream conveyor transmits an interrupt input signal. The interrupt input signal is indicative of arrival of a random article having a dimension greater than the predicted dimension of the upcoming article. In some embodiments, the material handling system including the downstream conveyor is a takeaway conveyor. In some instances, the material handling system including the upstream sensors is one of photo eye sensors, infrared sensors, laser sensors, cameras, pulse-position indicators, encoders, and their combinations.

Various aspects described herein, relates to, a method of dynamically computing release times for managing release of articles from upstream conveyors. The method includes receiving an information from one or more upstream sensors of one or more upstream conveyors, wherein the information comprises a length of one or more upstream articles travelling past the one or more upstream sensors and an operating speed of each of the upstream conveyors. Further, method includes calculating a cumulative length of the upstream articles accumulated at each of the upstream conveyors. After calculating the cumulative length, dynamically computing release times for each of the upstream articles accumulated on each of the upstream conveyors based on the cumulative length and the operating speed. The method further includes issuing an output signal to release the upstream articles accumulated on each upstream conveyor to a downstream conveyor based on the dynamically computed release times.

Various aspects described herein relate to a method of dynamically computing release times for managing release of articles from upstream conveyors, wherein the upstream articles form a first slug with first set of upstream articles on a first upstream conveyor and a second slug with second set of upstream articles on a second upstream conveyor.

In some cases, the method further includes computing a first release time for releasing the first slug on to the downstream conveyor and a second release time for releasing the second slug on to the downstream conveyor.

In some embodiments, the method further includes calculating the cumulative length of the one or more upstream articles further comprises accessing a first look-up table stored in a memory for the first upstream conveyor and a second look-up table stored in the memory for the second upstream conveyor. Each look-up table comprises individual article lengths of upstream articles accumulated in each of the respective upstream conveyors.

The method further includes summing individual article lengths of each upstream article in the first slug and the second slug. Various aspects described herein, relates to, a method of dynamically computing release times for managing release of articles from upstream conveyors, wherein the release time is dynamically computed using formula:

$$\text{release time} = \frac{\text{cumulative length}}{\text{speed of operation}}$$

Various aspects described herein relate to a controller for dynamically computing release times for managing release of articles from upstream conveyors. The controller includes a data store component to receive information from upstream sensors of upstream conveyors pertaining to a length of upstream articles travelling past the upstream sensors and an operating speed of each of the upstream conveyor. Further the controller includes a length detection module and a timing control module. The length detection module to calculate a cumulative length of the upstream articles accumulated at each of the upstream conveyor. The timing control module dynamically computing release times for the upstream articles accumulated on each of the upstream conveyor based on the cumulative length and the operating speed. Further, the controller issues an output signal to release the upstream articles accumulated on each upstream conveyor to a downstream conveyor based on the dynamically computed release times. The controller may include the data store component which includes look-up table with each look-up table comprising individual article lengths of the upstream articles accumulated in each of the upstream conveyor.

Various aspects described herein, relates to, a controller for dynamically computing release times for managing release of articles from upstream conveyors, wherein the upstream articles form a first slug with first set of upstream articles on a first upstream conveyor and a second slug with second set of upstream articles on a second upstream conveyor.

In some embodiments, the controller includes the length detection module which performs a summation of individual article lengths of each upstream article on the first slug and the second slug at a given point of time.

In other embodiments, the controller includes the timing control module which computes a first release time for releasing the first slug on to the downstream conveyor and a second release time for releasing the second slug on to the downstream conveyor.

Various aspects described herein, relates to, a controller for dynamically computing release times for managing release of articles from upstream conveyors. The controller includes the timing control module which computes the release time using formula $$\text{release time} = \frac{\text{cumulative length}}{\text{speed of operation}}$$

Various aspects described herein, relates to, a material handling system for dynamically computing release times for managing release of articles from upstream conveyors. The material handling system includes a first upstream conveyor, a second upstream conveyor, a downstream conveyor and a controller. The controller communicably coupled to upstream sensors installed on the first upstream conveyor and the second upstream conveyor. The controller is configured to receive an information from one or more upstream sensors of one or more upstream conveyors, wherein the information comprises a length of one or more upstream articles travelling past the one or more upstream sensors and an operating speed of each of the upstream conveyors. Further, the controller calculates a cumulative length of the upstream articles accumulated at each of the upstream conveyors. After calculating the cumulative length, the controller dynamically computes release times for each of the upstream articles accumulated on each of the upstream conveyors based on the cumulative length and the operating speed. The controller issues an output signal to release the upstream articles accumulated on each upstream conveyor to a downstream conveyor based on the dynamically computed release times.

The above summary contains simplifications, generalizations, and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

DETAILED DESCRIPTION

Conveyor systems having upstream and downstream conveyor arrangement often operate in either a zippering merge mode of operation or a wedge merge mode of operation. In this regard, when the conveyor system operates in the zippering merge mode, for releasing articles from an upstream conveyor to a downstream conveyor, the articles are timed to be released into the downstream conveyor so that the articles are interleaved, or zippered, together one after the other, with appropriate inter-article gaps between each of the articles before releasing the articles on the downstream conveyor. On the other hand, when the conveyor system operates in the wedge merge mode, for releasing articles from the upstream conveyor to the downstream conveyor, the articles are accumulated into groups on the upstream conveyor and are timed to be released into the downstream conveyor so that the articles are interleaved together one after the other, in groups, on to the downstream conveyor with almost no inter-article gaps between each of the articles. For operating the conveyor systems in any of the zippering merge mode and the wedge merge mode, it is usually required to pre-calibrate a controller driving operations of the upstream conveyor and the downstream conveyor. In this regard, pre-calibrating the controller includes defining rules, parameters, and values of parameters depending on defined rules for different operating conditions of the conveyor systems. For instance, in some situations, calibrating the conveyor systems for either of these modes requires defining default parameters like speed of operation of each upstream conveyor, calibration distance from the upstream conveyor to the downstream conveyor, a length of each upstream conveyor, or any inter-article spacing between articles moving on each upstream conveyor. Further, the pre-calibrating of the controller in driving operations of the upstream conveyors involves defining default parameters, such as a default accumulation length of articles in the upstream conveyors. Furthermore, the pre-calibrating of the controller in driving operations of the upstream conveyors involves defining rules for the upstream conveyors based on the defined default parameters, for instance, a rule is defined to release accumulated articles from each upstream conveyor for a predefined release time In general, in material handling environments, to pre-calibrate a controller of a conveyor system it is often required to define default parameters such as a speed of operation of an upstream conveyor, a calibration distance from the upstream conveyor to a downstream conveyor, a length of each upstream conveyor from amongst multiple upstream conveyors, any inter-article spacing between articles moving on each of the upstream conveyors in the conveyor system, or default accumulation length of articles or predefined release time of the accumulated articles. In some embodiments, these default parameters drive operations of the conveyor system and vary between a zippering merge mode operation and a wedge merge mode operation of the conveyor system. Also, it is often required to switch a mode of operation of the conveyor system between a wedge merge mode and a zippering merge mode of operation. In this regard, configuring the conveyor system for different modes of operations (e.g., the zippering merge mode and the wedge merge mode) and changing the pre-calibrated default parameters in real time when switching between these modes of operations is challenging and has associated limitations. When the conveyor system switches the mode of operation between the zippering merge mode and the wedge merge mode, an operator handling the conveyor system must manually define these default parameters into the controller. This process is tedious and time-consuming. The frequent switching of the modes of operations of the conveyor system or operators may result in errors in the pre-calibration of the controller. When the zippering merge mode based controller configuration is used for driving operations in the wedge merge mode, a timing mismatch occurs such that articles are timed to be interleaved one after the other from upstream conveyors into downstream conveyors and, due to this timing mismatch, the articles may collide with each other when released into the downstream conveyors.

In some cases, as described hereafter, a photo eye sensor is installed across the upstream and downstream conveyors for recording, in real-time, dimensions of articles while the articles convey along the upstream and downstream conveyors. In such cases, the recorded dimensions of the articles may be estimated as defined below to match up available spacing between existing articles on downstream conveyors before these articles are released on to the downstream conveyors so as to fit in the released articles between the existing articles on the available spacing. Real time recording and estimation of the dimensions of articles passing on the upstream conveyors to match up with the available spacing between existing articles on the downstream conveyors may cause high computational overhead to the controller controlling operation of the conveyor systems.

Further, when the articles are accumulated in the upstream conveyors when the conveyor system is operating with a wedge merge mode based controller configuration, the controller releases accumulated articles from each of the upstream conveyors only after a default accumulated length has been reached in each of the upstream conveyors. Further, the controller has a predefined release time for releasing the accumulated articles accumulated at each of the upstream conveyors. In this regard, when the actual length of the accumulated articles at each of the upstream conveyors is less than the default accumulated length, the controller may still use the predefined release time for releasing the accumulated articles. This may result in the actual accumulate length being less than the default accumulated length such that the controller may require less time to release the accumulated articles than the predefined release time. However, in conventional conveyor systems, each of the upstream conveyors will release their accumulated articles only for the predefined release time defined as a default parameter during pre-calibration of the controller. As a result, the process of merging articles from the upstream conveyors on to the downstream conveyor becomes slower and affects the overall productivity of the material handling system. Accordingly, there exists multiple challenges in optimizing release time of the accumulated articles when operating the controller of the conveyor system in the wedge merge mode based controller configuration.

For operating the conveyor system in multiple modes of operations, such as, but not limited to, a wedge merge mode and a zippering merge mode, the present subject matter provides a material handling system including a controller to determine a dimension of an article and a cumulative length of articles accumulated at each upstream conveyor before release of the articles from each upstream conveyor to the downstream conveyor. In this regard, the controller records dimensions of articles, for example, real-time length and width of the articles and a cumulative length of the accumulated articles yet to be released from each upstream conveyor over a period time. The controller records the dimensions of the articles to create an historical log of dimensions in a database. The controller predicts a dimension of an upcoming article yet to arrive at the upstream conveyor using the historical log of dimensions. Based on the predicted dimension of the upcoming article, the controller controls an operating speed of other upstream conveyors in order to create empty between existing articles on the other upstream conveyors for accommodating the upcoming article when it is released on to the downstream conveyor. In some embodiments, this historical log may be used not only for single carton release, but also for multiple carton release (e.g., slugs as defined hereafter). In this way, the historically averaged release time may be used to release all of the accumulated cartons on an upstream conveyor as a slug, and the slug release time may be adapted based on an accumulated carton length on the upstream conveyor as described hereafter.

The empty spaces described above may be created to place the upcoming article in between the existing articles when the upcoming article is released from the upstream conveyor on to the downstream conveyor along with existing articles of other upstream conveyors. Therefore, the dimension of the upcoming article is predicted by the controller before the upcoming article arrives at the upstream conveyor and the empty spaces for accommodating the upcoming article are created before the release of the upcoming article into the downstream conveyor. Further, the controller determines the cumulative length of the accumulated articles on the upstream conveyor and computes a release time for the accumulated articles based on the cumulative length of the accumulated articles. In this regard, the controller overrides the predefined release time pre-calibrated on the controller. Also, by way of implementation of various embodiments disclosed herein, a need to pre-calibrate the controller is obviated every time when the conveyor system switches from wedge merge mode to zippering merge mode or vice versa. Further, as the empty spaces are created beforehand based on the predicted dimension for the upcoming article, the upcoming article may be timed to be interleaved in the empty spaces without any timing mismatch or collision with the existing articles from the other upstream conveyors. Further, by computing a release time in real time for the articles accumulated on the upstream conveyor based on the cumulative length of the accumulated articles, the release time of the articles accumulated on the upstream conveyors is reduced. As a result, the articles accumulated on the other upstream conveyors no longer must wait for completion of the predefined release time pre-calibrated for the upstream conveyors. In this regard, the release time for each upstream conveyor is dynamically calculated based on the cumulative length of the accumulated articles in order to speed up the release of the accumulated articles into the downstream conveyor.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

The word "exemplary" is used herein to mean "serving as an example, instance, or illustration." Any implementation described herein as "exemplary" is not necessarily to be construed as preferred or advantageous over other implementations.

The term "processor" is used herein to refer to devices which can be configured to perform the various functionality set forth in this disclosure, either individually or in combination with other devices. Examples of processors may include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The term "processing system" may be used to refer to one or more processors, which may be included in a single device, or distributed among multiple physical devices.

According to the present subject matter, the term "module" or "component" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by the processor; other suitable hardware components that provide the described functionality; or a combination of some or all of the above, such as in a system-on-chip.

The term "slug" is used herein to refer to more than one article accumulated at an upstream conveyor with no gap or minimal gap between each article ready to be released on to the downstream conveyor.

The term "cumulative length of accumulated articles" is used herein to refer to a real time length of slugs obtained by adding individual length of the accumulated articles at any given point of time.

The term "default length of the accumulated articles" is used herein to refer to a maximum expected length of slugs at the upstream conveyors pre-calibrated at the controller.

The term "release time" is used herein to refer to a time required for the articles accumulated on the upstream conveyors to be released on to the downstream conveyor.

The term "predefined release time" is used herein to refer to a time required for the default length of the accumulated articles to be released on to the downstream conveyor.

The terms "articles", "upstream articles", "first set of upstream articles", or "second set of upstream articles" are used herein interchangeably throughout the description for referring to articles accumulated on upstream conveyors for a zipper release, slug release, or the like.

The term "upstream sensors", "first set of upstream sensors", or "second set of upstream sensors" are used herein interchangeably throughout the description for referring to multiple sensors positioned on upstream conveyors.

The terms "controller" or "central controller" are used herein interchangeably throughout the description for referring to controllers of the material handling system that coordinates operations of the merge subsystem.

For the purposes of this specification, it will be understood that a "conveyor" may refer to a device for conveying a plurality of articles in a conveyed direction in one or more paths/lanes, or one or more of the individual paths/lanes along which a number of articles are driven, irrespective of how many separate drive mechanisms are used to convey the articles along those paths/lanes. In some embodiments, a plurality of conveying lanes paths may be parallel, although in some embodiments, the lanes may not be parallel.

It will also be understood that various embodiments of the methods and conveying systems disclosed herein are not limited to conveying systems that transport articles of any particular size or shape. While the accompanying drawings depict articles that are only square or rectangular in shape, this is only for purposes of illustration, and it will be understood that the conveying systems and methods disclosed herein are equally applicable for transporting articles having different shapes and sizes. It will also be understood that the conveyor systems and methods disclosed herein are applicable to a variety of different conveyor types, such as belt conveyors, roller conveyors, and the like.

Further, the various principles disclosed herein may be applied to a number of feed conveyors that may be controlled in accordance with the principles disclosed herein. Also, the various principles disclosed herein may also be applied to only a single feed conveyor positioned downstream of an accumulation conveyor, if desired, thereby enabling the principles to be applied to a wide variety of different conveying system layouts and facilities having a single feed conveyor and/or multiple feed conveyors.

Further, the term "article" may indicate an object, thing, item, unit, piece of merchandise, commodity, product, good, or an entity synonymous with the definition provided.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a schematic block diagram of material handling system according to an embodiment. The material handling system 100 may include multiple conveyors configured to transport articles from a source location to a destination location in a material handling environment such as a warehouse or a distribution center. For example, the multiple conveyors may include multiple upstream conveyors and downstream conveyors. As illustrated, the material handling system 100 may include multiple upstream conveyors ranging from a first upstream conveyor 102a up to an nth upstream conveyor 102n, and a downstream conveyor 104 such as a takeaway conveyor. The value of n, for example, may be one of b, c, d, e and f, wherein the letters represent number of upstream conveyors that may be possibly included in the material handling system as a part of merge conveyor subsystem. In an example embodiment, the first upstream conveyor 102a, the nth upstream conveyor 102n, and the downstream conveyor 104 may be communicatively coupled to a first set of upstream sensors 106a, nth set of upstream sensors 106n, and downstream sensors 108, respectively. Further, the first upstream conveyor 102a, the nth upstream conveyor 102n, and the downstream conveyor 104 may be coupled to a first set of drive motors 110a, a nth set of drive motors 110n, and a downstream drive motor 112 (not shown), respectively. As illustrated, the first set of upstream sensors 106a, the nth set of upstream sensors 106n, and the downstream sensors 108 may be communicably coupled to a central controller 120 through an external communication bus 114a. The first set of drive motors 110a, the nth set of drive motors 110n, and the downstream motors 112 may be in turn communicably coupled to the central controller 120 through the external communication bus 114a. The central controller 140 may include a data store component 122, a processor 124, a memory 126, a communication component 128, a user interface component 130, a prediction module 140, a length detection module 150, and a timing control module 160. The data store component 122, the processor 124, the memory 126, and the prediction module 140, the length detection module 150 and the timing control module 160 are connected through an internal communication bus 114b to the communication component 128 and the user interface component 1304.

In an example implementation of the embodiment illustrated in FIG. 1, the first upstream conveyor 102a up to the nth upstream conveyor 102n may be accumulation conveyors to induct the articles into the downstream conveyor 104. In such implementation, the downstream conveyor 104 may be a merge conveyor to merge the articles conveyed from upstream conveyors 102a to 102n. In this regard, in operation, the first upstream conveyor 102a up to the nth upstream conveyor 102n transport articles from a source location and release the articles on the downstream conveyor 104, so that the articles released from the upstream conveyors 102a and 102n may be merged with the articles existing on the downstream conveyor 104. For example, the articles from the first upstream conveyor 102a may be released on to the downstream conveyor 104 and the articles from the nth upstream conveyor 102n may be merged with the articles released on the downstream conveyor 104.

As illustrated in FIG. 1, the first set of upstream sensor 106a, the nth set of upstream sensor 106n, and the downstream sensors 108 may be communicatively coupled to the first upstream conveyor 102a, nth upstream conveyor 102n and the downstream conveyor 104 respectively, for instance, in the form of an array of sensors positioned alongside the first upstream conveyor 102a, the nth upstream conveyor 102n, and the downstream conveyor 104, respectively. Illustratively, the array of sensors may be conventional array of photo-detectors, such as, but not limited to, infrared sensors, laser sensors, cameras, pulse-position indicators, encoders, and their combinations. The array of sensors may be used to detect presence, dimensions, and relative position of articles conveyed along the respective conveyors.

In accordance with an example embodiment, the first set of drive motors 110a, the nth set of drive motors 110n, and the downstream drive motors 112 may be coupled to control units of the first upstream conveyor 102a, the nth upstream conveyor 102n, and the downstream conveyor 104, so as to operate or drive the first upstream conveyor 102a, the nth upstream conveyor 102n, and the downstream conveyor 104, respectively, at varying speeds. In this regard, the central controller 120 may provide command signals for initializing operations of any of the first set of drive motors 110a, the nth set of drive motors 110n and the downstream drive motors 112 and accordingly, these drive motors may operate the movement of respective upstream and downstream conveyors 102a, 102n, and 104 in the material handling system 100. As long as drive motors 110a, 110n, and 112 are able to drive the upstream conveyors 102a, 102n, and downstream conveyor 104 at varying speeds, according to various embodiments of present subject matter, the drive motors 110a, 110n, and 112 are not specifically limited, and can be properly selected from those known in the art, examples thereof including an AC (alternating current) motor and a DC (direct current) motor, and specific examples including an electromagnetic force motor and the like.

As illustrated FIG. 1, the central controller 120 may include the data store component 122, which may be any suitable combination of hardware and/or software, that provides for mass storage of information, databases, and programs employed in connection with embodiments described herein. For example, data store component may be a data repository for applications not currently being executed by processor. Further, the central controller 120 may include the processor 124 that may include a single or multiple set of processors or multi-core processors, or alternatively, may be implemented as an integrated processing system and/or a distributed processing system. Illustratively, the central controller 120 further includes the memory 126 that may include any type of memory usable by a computer, such as random access memory (RAM), read only memory (ROM), tapes, magnetic discs, optical discs, volatile memory, non-volatile memory, and any combination thereof. Furthermore, the central controller 120 may include the communication component 128 to establish and maintain communications with one or more devices (or parties) utilizing hardware, software, and services as described herein. The communication component 128 may carry communications between components on the central controller 120, as well as between the central controller 120 and external devices, such as devices located across a communications network and/or devices serially or locally connected to the central controller 120. For example, the communication component 128 may include one or more buses, depicted as the external communication bus 114a and the internal communication bus 114b and further may include transmit chain components and receive chain components associated with a transmitter and receiver, respectively, operable for interfacing with external devices.

The central controller 120 may include the user interface component 130, which may be operable to receive inputs from a user of the central controller 120, and may be further operable to generate outputs for presentation to the user, such as via a visual display (e.g., LCD monitor, etc.). The user interface component 130 may include one or more input devices, including, but not limited, to a keyboard, a number pad, a mouse, a touch-sensitive display, a navigation key, a function key, a microphone, a voice recognition component, any other mechanism capable of receiving an input from a user, or any combination thereof. Further, the user interface component 130 may include one or more output devices, including, but not limited to, a display, a speaker, a haptic feedback mechanism, a printer, any other mechanism capable of presenting an output to a user, or any combination thereof.

The central controller 120 includes the prediction module 140 that performs computation on one or more input signals received via the communication component 128. The computation may be performed by accessing one or more input signals representative of information sensed by the upstream sensors of upstream conveyors previously stored in the data store component 122 and the memory 126 of the central controller 120. As a result of computation, the prediction module 140 may communicate one or more output signals to the controller 120 via the internal communication bus 114b.

According to an embodiment, when the material handling system 100 initiates a merge operation, the prediction module 140 may receive one or more input signals from the first set of upstream sensors 106a up to the nth set of upstream sensors 106n and the downstream sensors 108. The one or more input signals may be transmitted to the prediction module 140 via the communication component 128. The one or more input signals may be indicative of the presence or dimensions of articles moving on the first upstream conveyor 102a the nth upstream conveyor 102n and the downstream conveyor 104. According to an embodiment, the one or more input signals is a first input signal 116a and a nth input signal 116n which may be indicative of length of each article moving past the upstream sensors 106a, 106n. In an example, the first input signal 116a and the nth input signal 116n may be provided to the prediction module 140 only for a specific period of time. In another example, the first input signal 116a and the nth input signal 116n may be stored in the memory 126 of the central controller 120 until a predetermined number of articles have traveled past the first set of upstream sensors 106a and the nth set of upstream sensors 106n. In an example, the predetermined number of articles is indicative of article waves to be released on corresponding upstream conveyors 102a, 102n.

For example, first article wave containing five (5) upstream articles may be released on to the first upstream conveyor 102a to build a first slug comprising 5 articles and the second article wave containing ten (10) articles may be released on the nth upstream conveyor 102n to build a second slug comprising 10 articles. The article waves and the predetermined number of articles per wave are predefined and may be based on one or more factors, for example, a particular destination for a given vehicle (such as a semi-trailer, airplane, etc.) or based on different classes of articles intended for the same destination or based on the articles that are processed during a particular time period, such as during a worker shift, a portion of a shift, a day, or some other time period. Therefore, after the article waves have passed through the upstream sensors 106a, 106n of the upstream conveyors 102a, 102n, the length or dimension of each article may be communicated as the first input signal 116a and the nth input signal 116n to the prediction module 140 or stored in the memory of the central controller 120 to be accessed by the prediction module 140. The prediction module 126 processes the one or more input signals and creates a historical log of the received one or more input signals in the data store component 122 or in the memory 126. The historical log may be updated at periodic intervals by the prediction module 140. For example, the historical log may be in the form of a look-up table that includes a collation of first input signals 116a that represent dimensions or a length of the articles which are conveyed on the first upstream conveyor 102a over specific period of time. According to an example embodiment, look-up tables may be created for each upstream conveyor starting from the first upstream conveyor 102a up to the nth upstream conveyor 102n, wherein each look-up table includes length of each article corresponding to article waves of each upstream conveyors 102a, 102n. For example, a first look-up table for the first article wave comprising individual length of 5 articles accumulated on the first upstream conveyor 102a and a second look-up table for the second article wave comprising the individual length of 10 articles accumulated on the nth upstream conveyor 102n.

The length detection module 150 accesses this historical log from the memory 126. For example, the length detection module 150 accesses each look-up table stored in the memory 126 corresponding to each upstream conveyor from 102a to 102n. The length detection module 150 performs a computation on data accessed from each look-up table and, for example, performs a summation of the individual length of articles from each look-up table. As a result of the computation, the length detection module 150 may transmit one or more output signals to the timing control module 160. The one or more output signals are indicative of cumulative sum of length of articles in each look-up table. For example, the length detection module 150 may transmit a first output signal 152 indicative of the cumulative sum of length of articles in the first look-up table belonging to the first slug and a second output signal 154 indicative of the cumulative sum of length of articles in the second look-up table belonging to the second slug.

The timing control module 160 performs a computation on the received one or more output signals from the length detection module 150. The computation involves calculating a release time for articles accumulated in each upstream conveyors from first upstream conveyor 102a to nth upstream conveyor 102n based on the cumulative sum of length of articles. For example, the first article wave includes 5 articles having a cumulative length "A" and the second article wave includes 10 articles having a cumulative length "B". Then, the timing control module based on the cumulative length "A" calculates a first release time for releasing the first article wave from the first upstream conveyor 102a to the downstream conveyor 104 and based on the cumulative length "B" calculates a second release time for releasing the second article wave from the nth upstream conveyor 102n to the downstream conveyor 104. The calculated release times are then communicated from the timing control module 129 to the internal communication bus 114b as third output signals 162.

The central controller 120 controls a speed of the first set of drive motors 110a and nth set of drive motor 110n based on the third output signals 162. For example, the speed of the first set of drive motors 110a and nth set of drive motors 110n is controlled based on the computed release times for the first slug and the second slug. The central controller 120 upon receiving the first release time for the first upstream conveyor 102a issues a first command signal 132a to release the first slug and further issues a first timing control signal 132b to release the first slug at the computed release time by altering the speed of the first set of drive motors 110a. After, the first slug is released, the central controller 140 issues a second command signal 134n to release the second slug from the nth upstream conveyor 102n and further issues a second timing control signal 134n' to release the second slug at the computed release time by altering the speed of the nth set of drive motors 110n. In this manner, the first slug and the second slug comprising a predetermined number of articles are released from the upstream conveyor 102a to 102n at the computed release times, for example, first and second release times, to the downstream conveyor 104. Therefore, by computing release times individually for each upstream conveyor based on the cumulative length of the slug accumulated on each upstream conveyor, the processing speed for merging the articles of each slug on to the downstream conveyor is increased and the time taken for merging is reduced. In addition, an idle wait time caused by applying the predefined release time for the articles accumulated on the upstream conveyors is obviated as the predefined release time is overridden by real time computation of release times for each upstream conveyor based on the cumulative length of the slugs at any given point of time.

Further, the prediction module 140 performs computation on the historical log after it receives instructions from the controller 120. As a result of the computation, the prediction module 140 may transmit one or more output signals to the communication component 128 via the internal communication bus 114b. The one or more output signals may be a fourth output signal 142. The fourth output signal 142 is indicative of dimensions of articles predicted by the prediction module 140 before the articles arrive at the first upstream conveyor 102a or the nth upstream conveyor 102n. In other words, the fourth output signal 142 includes dimensions of articles that will arrive in near future at the first upstream conveyor 102a or the nth upstream conveyor 102n. For example, by utilizing the dimensions of the articles recorded over a period of time by upstream sensors and stored in the look-up table, the prediction module performs a computation that arrives at a dimension that is predicted to be the dimension of an upcoming article yet to arrive at either the first upstream conveyor 102a or the nth upstream conveyor 102n. According to an embodiment, the central controller 140 controls a speed of first set of drive motors 110a of the first upstream conveyor 102a based on the fourth output signal 142. For example, the speed of the first set of drive motors 110a is controlled to create empty spaces on the first upstream conveyor 102a in accordance with the fourth output signal 142. The empty spaces are equal to the dimensions of articles predicted to arrive in the near future at the nth upstream conveyor 102n. After, the empty spaces are created on the first upstream conveyor 102a, the central controller 120 via the communication component 128 issues a third command signal 136a to release articles from the first upstream conveyor 102a to the downstream conveyor 104 along with the empty spaces.

Once the articles are released from the first upstream conveyor 102a into the downstream conveyor 104, the central controller 120 issues a third timing control signal 136n to the nth set of drive motors 110n to control the time of release of the upcoming article from the nth upstream conveyor 102n. In an example, the timing control signal 132 may be issued after the downstream sensors 108 of the downstream conveyor 104 senses the arrival of the empty spaces on the downstream conveyor 104. The central controller 120 coordinates the time for release of the articles from the nth upstream conveyor 102n into the empty spaces on the downstream conveyor 104. For example, the articles of the nth upstream conveyor 102n whose dimensions are predicted beforehand by the prediction module 140 and released by the central controller 120 into the empty spaces created on the first upstream conveyor 102a, wherein the empty spaces are created equal to or greater than equal to the dimension predicted beforehand by the prediction module 140. Therefore, the prediction module 140 of the central controller 120 predicts the dimensions of the articles on the upstream conveyors beforehand and creates empty spaces equal to the predicted dimensions in order to facilitate the articles from the upstream conveyors to be timed to be released into the downstream conveyor without colliding with existing articles released from subsequent upstream conveyors.

Figure 2A:
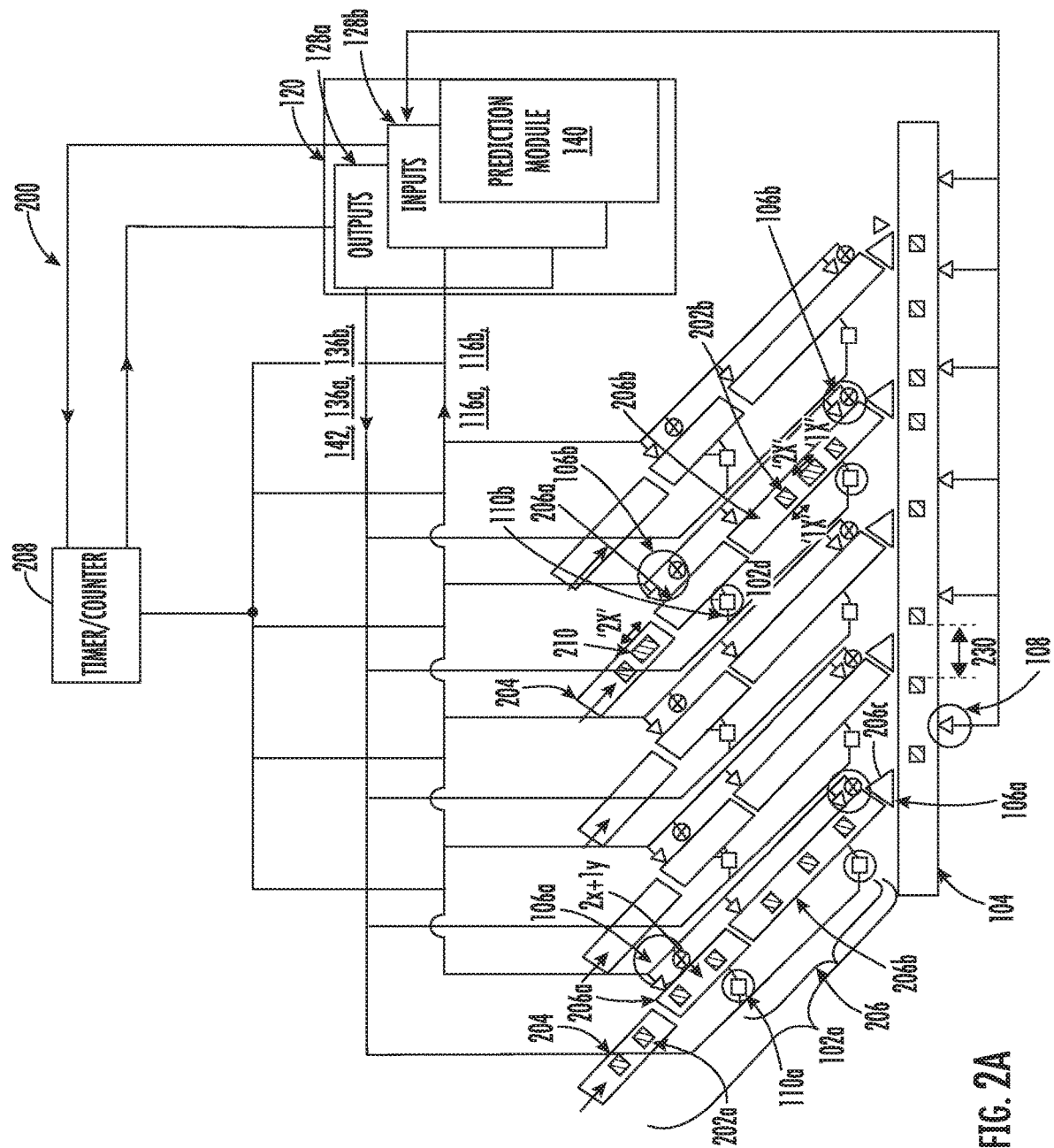
FIG. 2A illustrates a diagrammatic plan view of a merge subsystem in a wedge merge mode configuration operating with zippering merge mode, according to an example embodiment.

FIG. 2A illustrates a diagrammatic plan view of a merge subsystem in a wedge merge mode configuration operating with zippering merge mode, according to an example embodiment. FIG. 2A is an example embodiment of a merge subsystem 200 within a material handling system 100.

For the purpose of simplicity and clarity, operation of the merge subsystem 200 in accordance with the present subject matter is explained in conjunction with only two upstream conveyors 102a, and 102n (as shown in FIG. 1), however, those skilled in the art will appreciate that the present subject matter may be enabled with multiple upstream conveyors of the merge subsystem 200. The value of n, for example, may be b, c, d, e and f, wherein the letters represents the number of upstream conveyors in the merge subsystem 200. For the purpose of illustration and ease of understanding, the nth upstream conveyor 102n (as shown in FIG. 1) is assumed to be the fourth upstream conveyor 102d (as shown in FIG. 2A), hereinafter throughout the description.

A plurality of upstream conveyors 102a, 102b, 102c, 102d, and 102e are illustrated as being disposed to release articles onto downstream conveyor or takeaway conveyor 104. Each upstream conveyor 102a, 102b, 102c, 102d, and 102e includes an accumulation conveyor 204 and a feed conveyor 206. Accumulation conveyors 204 may be disposed upstream of feed conveyors 206 to receive upstream articles 202 from accumulation conveyors 204. Each of the feed conveyors 206 may include a metering conveyor 206a, a staging conveyor 206b and a spur 206c. Each of the upstream conveyors 102a, 102b, 102c, 102d, and 102e includes upstream sensors 106, for example, photo eyes encoders, limit switches. Similarly, the downstream conveyor 104 includes downstream sensors 108, for example, photo eyes and encoders. In an example, the upstream sensors 106 may be positioned to measure presence, dimension or length of the upstream articles 202, movement of the upstream conveyors 102a, 102b, 102c, 102d, and 102e, operating speed of the upstream conveyors 102a, 102b, 102c, 102d, and 102e and the downstream sensors 108 may be positioned to measure presence, and inter-article gaps existing between one or more articles of the upstream articles 202 released on to the downstream conveyor 104.

It is noted that although five upstream conveyors 102a, 102b, 102c, 102d, and 102e are illustrated, any suitable number of upstream conveyors may be utilized. According to an embodiment, it is noted that upstream conveyors 102a, 102b, 102c, 102d, and 102e may be disposed on either side of the downstream or takeaway conveyor 104, disposed in non-uniformly spaced locations, disposed at non-uniform orientations, and may be physically different from each other in length, size and number of individual conveyor sections. Though a plurality of upstream conveyors 102a, 102b, 102c, 102d, and 102e are disclosed in FIG. 2A, for simplicity of explanation, upstream conveyors 102a and 102d will be described.

In FIG. 2A, the first upstream conveyor 102a and the fourth upstream conveyor 102d are shown to operate in zipper release mode. For example, the first upstream conveyor 102a includes a first set of upstream sensors 106a and first set of upstream articles 202a that may be zipper released from the first upstream conveyor 102a operating in the zipper release mode. Similarly the fourth upstream conveyor 102d includes second set of upstream sensors 106b and a second set of upstream articles 202b that may be zipper released from the fourth upstream conveyor 102d.

With continued reference to FIG. 2A, one or more input signals from the first set and second set of upstream sensors 106a, 106b may be received by the controller 120 via an input component 128a. For example, the information sensed by the second set of upstream sensors 106b on the fourth upstream conveyor 102d may be communicated as one or more input signals to the controller 120.

After the controller 120 receives the one or more input signals, the controller 120 may process the one or more input signals using the prediction module 140. As a result of the processing, the controller 120 generates one or more output signals, which are transmitted via an output component 128b to first set of drive motors 110a on the first upstream conveyor 102a and second set of drive motors 110b on the fourth upstream conveyor 102d. The first set of drive motors 110a and second set of drive motors 110b adjusts a speed of each of the first upstream conveyor 102a and the fourth upstream conveyor 102d in accordance with the one or more output signals. In an embodiment, the input component 128a, and the output component 128b may be a part of the communication component 128, as described above with reference to FIG. 1.

In operation, the second set of upstream sensors 106b positioned on fourth feed conveyor 102d relays information pertaining to the second set of upstream articles 202b that travels past the second set of upstream sensors 106b. The information pertaining to the second set of upstream articles 202b may be provided as a second input signal (116b as shown in FIG. 1) to the input component 128a of the central controller 120. The information pertaining to the second set of upstream articles 202b may include presence, dimensions, or length of each article of the second set of upstream articles 202b, The input component 128a after receiving the information from the second set of upstream sensors 106b, may transmit the information to a memory 126 of the central controller 120 to log the information. According to an embodiment, a historical log of the information pertaining to the second set of upstream articles 202b may be created at the memory 126 for future processing. The historical log, for example, may exist in the form of a look-up table that collates the information of the second set of upstream articles 202b over a period of time. In an embodiment, the information may be transmitted to the central controller 120 at predefined time interval. For example, a timer/counter circuit 208 may be communicably coupled to the second set of upstream sensors 106b of the fourth upstream conveyor 102d to define a predefined time interval at which the each of the second set of upstream sensors 106b of the fourth upstream conveyor 102d must start to record and stop to record the information of the second set of upstream articles 202b a. According to another embodiment, the information may be transmitted to the central controller 120 from the second set of upstream sensors 106b of the fourth upstream conveyor 102d after a predetermined number of second set of upstream articles 202b have traveled passed the second set of upstream sensors 106b of the fourth upstream conveyor 102d. For example, a timer/counter circuit 208 may be communicably coupled to the second set of upstream sensors 106b to define a predetermined count for the second set of upstream articles 202b. After the predetermined count is reached, the second set of upstream sensors 106b may stop to record the information of the second set of upstream articles 202b and transmit the information to the central controller 120.

According to an embodiment, the prediction module 140 may be activated after the predefined time interval or after the predetermined count of second set of upstream articles 202b have traveled passed the second set of upstream sensors 106b of the fourth upstream conveyor 102d. Upon activation, the prediction module 140 may access the historical log stored at the memory 126 of the central controller 120 to perform computations on the information recorded in the historical log in order to predict a dimension of an upcoming article 210 that would arrive in the near future at the fourth upstream conveyor 102d. For example, the prediction module 140 uses the historical log and performs certain calculations to predict a dimension of the upcoming article 210. For example, the upcoming article 210 is the article from among the second set of upstream articles 202b that has not yet traveled past the second set of upstream sensors 106b on the fourth upstream conveyor 102d. The upcoming article 210 is a subset to the second set of upstream articles 202b arriving at near future and waiting to travel past the second set of upstream sensors 106 of the fourth upstream conveyor 102d.

The dimension of the upcoming article 210, for example, indicates a length value of the upcoming article 210, wherein the length value of the upcoming article 210 is dependent on the length value of the second set of upstream articles 202b whose length values are recorded in the memory 126 as the information pertaining to the second set of upstream articles 202b. For example, consider the historical log including a look-up table containing the information of last three articles from the second set of upstream articles 202b sensed and recorded by the second set of upstream sensors 106b of the fourth upstream conveyor 102d. The information of last three articles may include information pertaining to length values of the last three articles traveled past the second set of upstream sensors 106b. The length values of the last three articles may be "1X", "2X", and "1X" respectively, wherein "×" corresponds to measurement of length in either inches or feet. The prediction module 140 of the controller 120 may access these length values and perform computations on these length values to predict a length value for the upcoming article 210 that is yet to arrive at the fourth upstream conveyor 102d. The computations performed by the prediction module 140, for example, may include finding a length value which is larger among the length values of last three articles and may set the largest length value as the length value of the upcoming article 210. According to the example explained herein, the largest length value is "2X". In this regard, the prediction module 140 may predict the dimension of the upcoming article 210 that would arrive at the fourth upstream conveyor 102d. The prediction module 140 may predict the dimension of the upcoming article 210 before the upcoming article 210 arrives at the second set of upstream sensors 106b of the fourth upstream conveyor 102d. For example, prediction of the dimension of the upcoming article 210 may occur when the upcoming article 210 transits from the accumulation conveyor 204 into the feed conveyor 206 of the fourth upstream conveyor 102d.

According to an example embodiment, the prediction module 140 of the controller 120 predicts a dimension of the upcoming article 210 and relays the predicted dimension as an output signal, for example, fourth output signal 142 as shown in FIG. 1, to the controller 120. The controller 120 in turn issues a command signal such as third command signal 136a of FIG. 1 to the first set of drive motors 110a of the first upstream conveyor 102a and a timing control signal such as the third timing control signal 136b as shown in FIG. 1 to the second set of drive motors 110b of the fourth upstream conveyor 102d. When the fourth output signal 142 is communicated to the controller 120, the controller 120 operates a motor controller (not shown) of the first set of drive motors 110a of the first upstream conveyor 102a, the motor controller accelerates or decelerates the first set of drive motors 110a to control a speed of the first upstream conveyor 102a. The speed of the first set of drive motors 110a is controlled in order to create empty spaces 230 between one or more articles of the first set of upstream articles 202a travelling on the first upstream conveyor 102a. The empty spaces 230 are created based on the fourth output signal 142 which is indicative of the predicted dimension of the upcoming article 20 at the fourth upstream conveyor 102d. Thus, the empty spaces 230 created on the first upstream conveyor 102a will have a dimension equal to the dimension of the upcoming article 210.

For example, the length value of the upcoming article 210 is predicted as "2X", then empty spaces 230 of length value "2X" is created in between one or more articles of the first set of upstream articles 202a however, the first set of upstream articles 202a may already have a constant inter-article gap of "1Y" existing there between the one or more articles of the first set of upstream articles 202a. Thereby, the controller 120 controls the speed of the first set of drive motors 110a of the first upstream conveyor 102a in a manner to introduce the empty spaces 230 in addition to the inter-article gap "1Y". Therefore, the controller 120 may create empty spaces 230 of length value equal to "2X+1Y", wherein 2X corresponds to the predicted length value of upcoming article 210 and 1Y corresponds to the inter-article gap between one or more articles of the first set of upstream articles 102a. According to an embodiment, the dimension predicted for the upcoming article 210 may be applicable to all upcoming articles 210 that will be conveyed on the fourth upstream conveyor 102d. Therefore, multiple empty spaces 230 of same dimensions equal to the dimension of the upcoming articles 202 may be created on the first upstream conveyor 102a. Thus, the empty spaces 230 created between the one or more articles on the first upstream conveyor 102a will have a dimension greater than or equal to the dimension of the upcoming article 210.

According to an embodiment, after the empty spaces 230 with inter-article gaps are created constantly on the first upstream conveyor 102a, the controller 120 may issue the third command signal 136a to the motor controller of the first upstream conveyor 102a to release the first set of upstream articles 202a along with created empty spaces 230. The first set of upstream articles 202a are released with the created empty spaces 230 on to the downstream conveyor 104 or takeaway conveyor. According to an example embodiment, the motor controller releases the first set of upstream articles 202a into the downstream conveyor 104 as and the empty spaces 230 are created without waiting for the third command signal 136a from the central controller 120. After the release of the first set of upstream articles 202a, the central controller 120 issues the third timing control signal 136b to time the release of the upcoming articles 210 on the fourth feed conveyor 102d. In an example, when the downstream sensors 108 disposed on the takeaway conveyor 104 senses the arrival of the first set of upstream articles 202a with empty spaces 230 from the first upstream conveyor 102a, the downstream sensors 104 senses the presence of the empty spaces 230 between one or more articles of the first set of upstream articles 202a. Once the presence of the empty spaces 230 are sensed by the downstream sensors 108, it may transmit an indication signal to the central controller 120. In response, the central controller 120 issues the third timing control signal 136b for timing the release of the upcoming articles 210 from the fourth upstream conveyor 102d into the empty spaces 230 on the takeaway conveyor 104. Therefore, the first upstream conveyor 102a, the fourth upstream conveyor 102d, and the downstream conveyor 104 are controlled in coordination by the central controller 120 in order to release the upcoming articles 210 of the fourth upstream conveyor 102d in a timely manner into the empty spaces 230 created beforehand the release of the upcoming article 210. Therefore, by predicting the dimension of upstream articles 202 and creating empty spaces 230 for accommodating those upstream articles 202 before their release into the downstream conveyor 104, the possibility of potential collision at the downstream conveyor 104 between upstream articles 202 released from subsequent upstream conveyors is obviated.

Figure 2B:
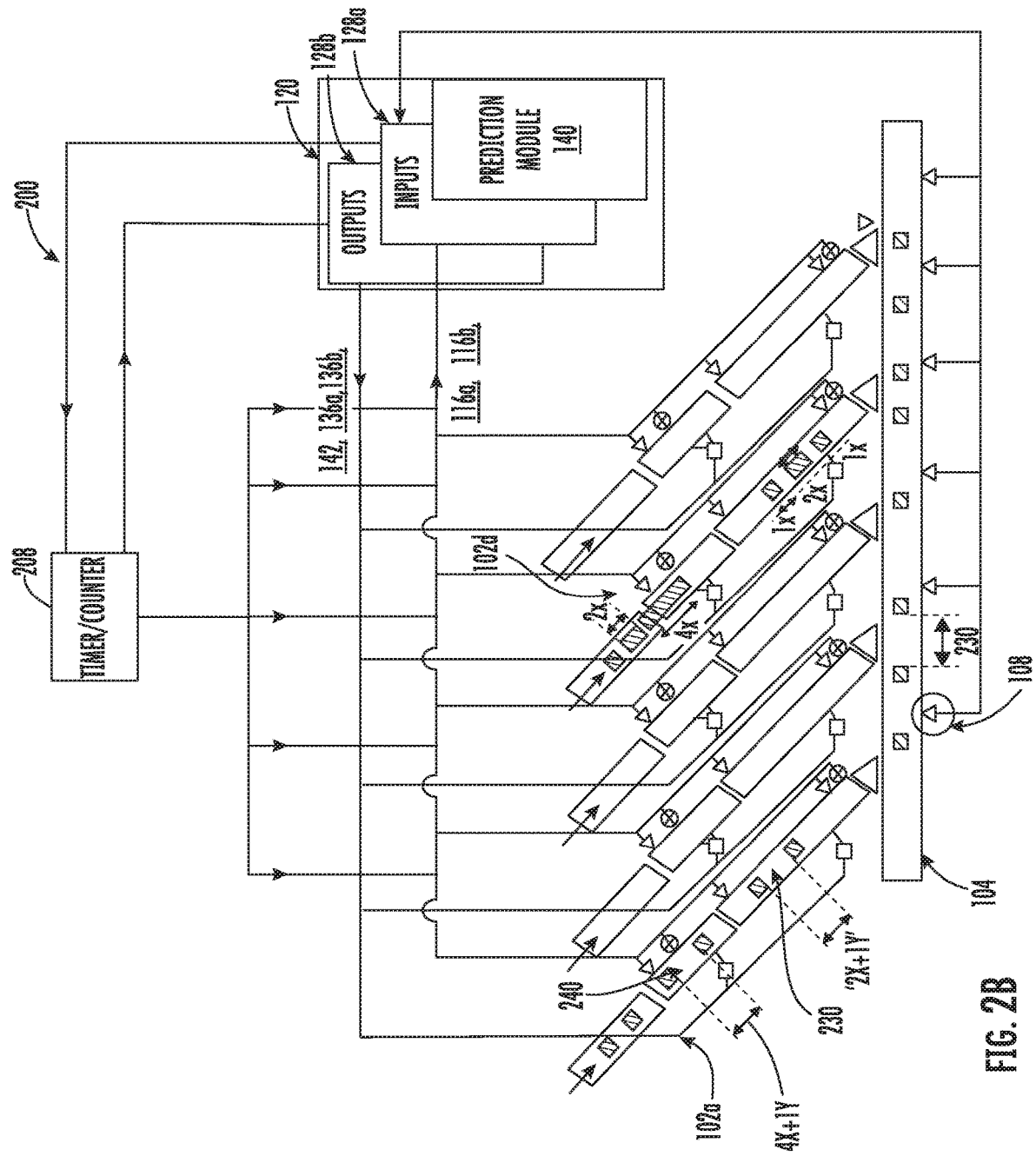
FIG. 2B illustrates a diagrammatic plan view of a merge subsystem in a wedge merge mode configuration operating with zippering merge mode, according to another embodiment.

FIG. 2B illustrates a diagrammatic plan view of a merge subsystem in a wedge merge mode configuration operating with zippering merge mode, according to another embodiment. FIG. 2B replicates the arrangement and operation of the merge subsystem 200 of FIG. 2A except that an additional empty space 240 may be introduced in the first upstream conveyor 102a based on calculation of real-time length value of a random article 220 from the second set of upstream articles 216a upcoming at the fourth upstream conveyor 202d.

According to an example embodiment, one or more upstream sensors of the second set of upstream sensors 106b of the fourth upstream conveyor 102d may be configured only to detect random articles 220 with dimensions greater than the predicted dimension of the upcoming article 210 as shown in FIG. 2A. In this regard, the second set of upstream sensors 106b of the fourth upstream conveyor 102d may be configured to monitor and detect the second set of upstream articles 202b and identify articles whose dimension is greater than the dimension predicted by the prediction module 140 for the upcoming article 210. Upon detection of the random article 220 whose dimension is greater that the dimension of the upcoming article 210, the second set of upstream sensors 106b may communicate an interrupt signal to the central controller 120 in real-time. The interrupt signal may be indicative of the dimension of the random article 220. After receiving the dimension of the random article 220, the controller 120 may compare the previously-predicted dimension of the upcoming article 210 with the dimension of the random article 220. As a result, the controller 120 may control a speed of the first upstream conveyor 102a to position the first set of upstream articles 202a in a manner to create an additional empty space 240 corresponding to the dimension of the random article 220.

In an example, the prediction module 140 may begin a computation to predict length value of an upcoming article 210 based on length values "1X", "2X", "1X" of last three articles of the second set of upstream articles 202b released from the fourth feed conveyor 102d. The computation is performed to find a largest length value from among the length values "1X", "2X", "1X" of the last three articles. The largest length value is determined to be "2X". The largest length value "2X" is set as a predicted length value of the upcoming article 210. The controller 120 may control the speed of the first upstream conveyor 102a to create empty spaces 230 between the first set of upstream articles 202a on the first upstream conveyor 102a based on the predicted length value "2X". The empty spaces 230 of length value "2X+1Y" are created, where "2X" corresponds to the predicted length value and "1Y" corresponds to the inter-article gap currently existing in between the first set of upstream articles 202a on the first upstream conveyor 102a. In such a scenario, when the controller 120 continues to control the speed of the first upstream conveyor 102a to create empty spaces 230 of "2X+1Y" between the first set of upstream articles 102a, the second set of upstream sensors 106b of the fourth upstream conveyor 102d may detect in real time a random article 220 from among the second set of upstream articles 202b having a length value, say "4X". In such scenario, the controller 120 may pause to control the speed of the first upstream conveyor 102a based on the predicted length value "2X", and may start to control the speed of the of the first upstream conveyor 102a based on the real-time length value "4X" of the random article 220 upon receiving the interrupt signal from the second set of upstream sensors 106b of the fourth upstream conveyor 102d. In other words, the controller 120 may pause to drive the first set of drive motors 110a of the first upstream conveyor 102a to create the empty spaces 230 of length value "2X" and may start to drive the first set of drive motors 110a of the first upstream conveyor 102a to create an additional empty space 240 that corresponds to the real-time length value "4X" of the random article 220. Thereby, the controller 120 may create two empty spaces 230 and 240. For example, an empty space 230 of length value "2X+1Y" corresponding to the predicted length value "2X" obtained from the prediction module 140 and an additional empty space 240 of length "4X+1Y" corresponding to the real-time length value "4X" obtained from the second set of upstream sensors 106b of the fourth upstream conveyor 102d. Therefore, the first upstream conveyor 102a and the fourth upstream conveyor 102d may be controlled in coordination by the controller 120 to create empty spaces 230, 240 and accordingly time the release of the second set of upstream articles 202b into the created empty spaces 230, 240.

Figure 3A:
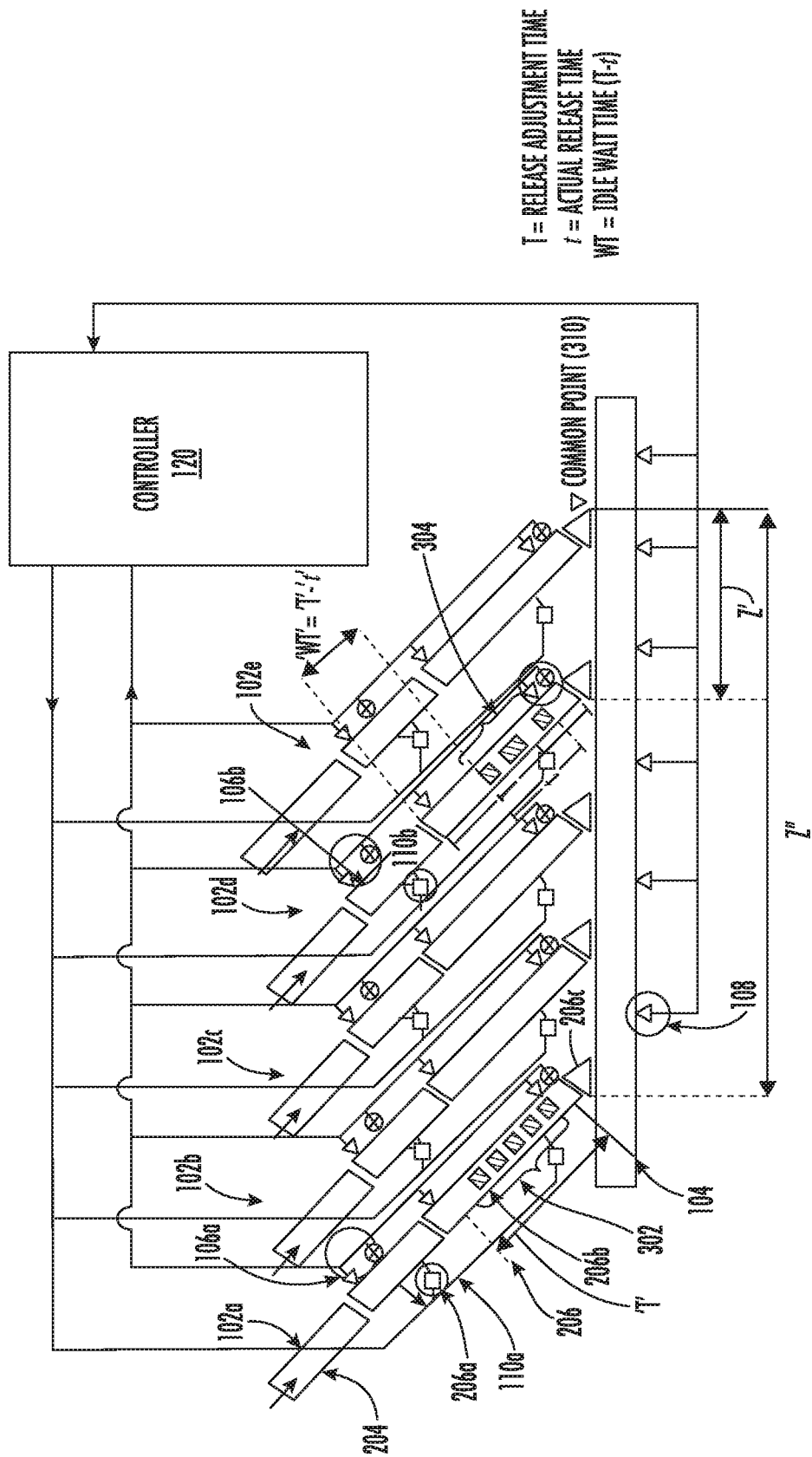
FIGS. 3A and 3B illustrate a diagrammatic plan view of a merge subsystem operating in a wedge merge mode.
Figure 3B:
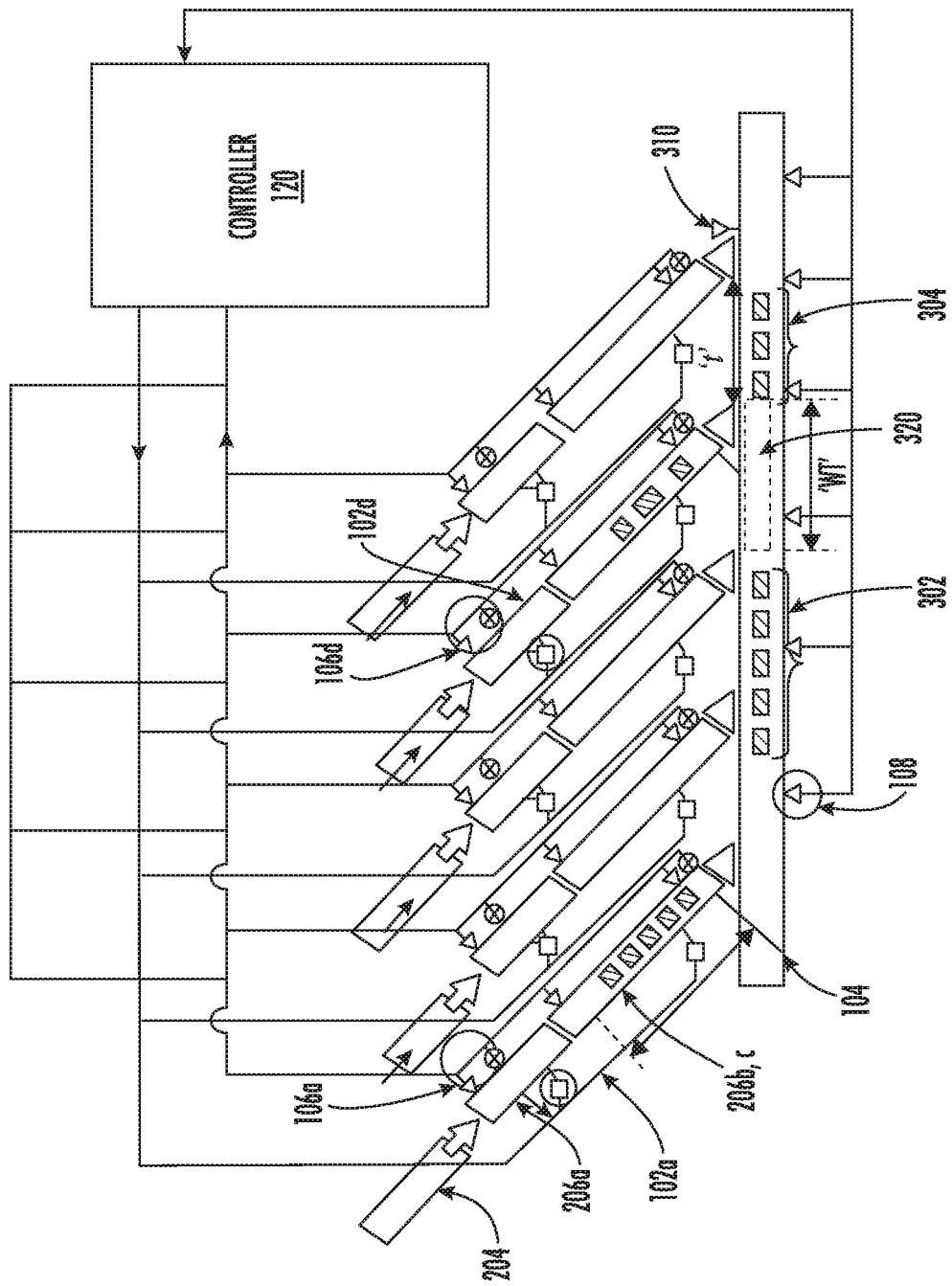

FIGS. 3A and 3B illustrates a diagrammatic plan view of a merge subsystem operating in a wedge merge mode. A plurality of upstream conveyors 102a, 102b, 102c, 102d, and 102e are illustrated disposed to release articles onto downstream conveyor or takeaway conveyor 104. Each upstream conveyor 102a, 102b, 102c, 102d, and 102e includes an accumulation conveyor 204 and a feed conveyor 206. Accumulation conveyor 204 may be disposed upstream of the feed conveyor 206 to receive upstream articles 202 from the accumulation conveyor 204.

Each of the feed conveyor 206 may include metering conveyor 206a, staging conveyor 206b, and spur 206c. Each of the upstream conveyors 202 includes upstream sensors 106, for example photo eyes encoders, limit switches, or the like. Similarly, the downstream conveyor 104 includes downstream sensors 108, for example photo eyes and/or encoders. In an example, the upstream sensors 106 may be positioned to measure presence, dimension, or length of each upstream article 202, movement of the upstream conveyors 102a, 102b, 102c, 102d, and 102e, operating speed of each upstream conveyor 102a, 102b, 102c, 102d, and 102e. The downstream sensors 108 may be positioned to measure presence, inter-article gaps between one or more articles of the upstream articles 202 released on to the downstream conveyor 104, and inter-slug gap between one or more slugs released from the upstream conveyors 102a, 102b, 102c, 102d, and 102e to the downstream conveyor 104.

It is noted that although five upstream conveyors 102a, 102b, 102c, 102d, and 102e are illustrated, any suitable number of upstream conveyors may be utilized. According to an embodiment, it is noted that upstream conveyors 102a, 102b, 102c, 102d, and 102e may be disposed on either side of the takeaway conveyor 104, disposed in non-uniformly spaced locations, disposed at non-uniform orientations, and may be physically different from each other in length, size and number of individual conveyor sections. Though a plurality of upstream conveyors 102a, 102b, 102c, 102d, and 102e are disclosed in FIG. 3A, for simplicity of explanation, upstream conveyors 102a and 102d will be described.

In FIG. 3A, the first upstream conveyor 102a and the fourth upstream conveyor 102d are shown to operate in the wedge merge mode. For example, the first upstream conveyor 102a includes a first set of upstream articles 202a that may form a first slug 302 on the first upstream conveyor 102a operating in the wedge merge mode. Similarly a second set of upstream articles 202b may form a second slug 304 on the fourth upstream conveyor 102d. For example, the first slug 302 is built from a first wave of articles arriving at the first upstream conveyor 102a at a given point of time, and the second slug 304 is built from a second wave of articles arriving at the fourth upstream conveyor 102d at a given point of time. A first wave of articles, for example, may include five (5) upstream articles and the second wave of articles, for example, may include three (3) upstream articles. These article waves and the number of upstream articles per wave are predefined and may be based on one or more factors, for example, a particular destination for a given vehicle (such as a semi-trailer, airplane, etc.) or based on different classes of articles intended for the same destination or based on the articles that are processed during a particular time period, such as during a worker shift, a portion of a shift, a day, or some other time period. The first slug 302 and the second slug 304 are released at a predefined release time on to the downstream conveyor 104.

For example, the predefined release time is assigned for each upstream conveyors 102a, 102d in the merge subsystem. This predefined release time is calculated based on a distance between each of the upstream conveyor 102a, 102d and a common point 310 on the downstream conveyor 104. This distance may be defined as a pre-calibration distance since the distance from each of the upstream conveyor 102a, 102d to the common point 310 is measured beforehand to pre-determine the predefined release time for each upstream conveyor 102a, 102d. As shown in FIG. 3A, the pre-calibration distance of the fourth upstream conveyor 102d may be Z' provided in units of time for releasing the second slug 304. The pre-calibration distance of the first upstream conveyor 102a may be Z" provided in units of time for releasing the first slug 302. For example, Z' for the release of the second slug 304 may be determined to be 13 seconds and Z" for the release of the first slug 302 may be 20 seconds such that the central controller 120 will operate the first and the fourth upstream conveyor 120a, 102d to release the first and the second slug 302, 304 for a predefined release time of 30 seconds in order to have a uniform release time for all the upstream conveyors 102a, 102d. The first upstream conveyor 102a may have to wait for the second slug 304 to fully release from the fourth upstream conveyor 102d before releasing the first slug 302 in order to avoid collision with the second slug 304. In such scenario, a release adjustment time "T" is added to the predefined release time in order to ensure that the second slug 304 is fully released on to the downstream conveyor 104 so that the first slug 302 can be released without any interference. In this regard, as shown in FIG. 3A, the release adjustment time "T" may be calculated using the formula (release adjustment time (T)=predefined release time − or +(Z"-Z')), which in this example is (release adjustment time (t=T)=30 seconds − or +(20 seconds−13 seconds))=23 or 37 seconds. This release adjustment time "T" is a required wait time period for the first upstream conveyor 102a before it releases the first slug 302. In such case, there exists a possibility that the second slug 304 may only have 3 articles of cumulative length 10 feet to be released, which may require less release time "t", for example, say t=3 seconds, than the predefined release time 30 seconds or release adjustment time "T" of 23 or 37 seconds. However, the second slug 304 will be released for the release adjustment time "T" of 23 seconds or 37 seconds and, therefore, the fourth upstream conveyor 102d will continue to operate for a minimum of "Tmin"=23 seconds and a maximum of "Tmax"=37 seconds after the second slug 304 is fully released from the fourth upstream conveyor 102d within an actual release time "t" of 3 seconds on to the downstream conveyor 104. Therefore, the first upstream conveyor 102a may wait for completion of (Waiting time "WT"=release adjustment time (T)−actual release time (t)), which is equal to 23 seconds−3 seconds=20 seconds of operation of the fourth upstream conveyor 102d to release the first slug 302. This waiting time period "WT"=20 seconds of the first upstream conveyor 102a is an idle time period at which none of the upstream conveyors releases their corresponding slug of articles. This idle time period in turn slows down the merging process and affects the overall productivity of the material handling system. A gap 320 formed between the release of the second slug 304 and the first slug 302 due to idle wait time "WT" is shown in FIG. 3B.

Therefore, in order to avoid the aforementioned shortcomings and disadvantages, embodiments of the present subject matter as shown in FIG. 3B include a length detection module 150 and a timing control module 160 of the central controller 120 to compute a cumulative length "C" of the slugs on each upstream conveyor 102a, 102b, 102c, 102d, 102e, where the cumulative length of the accumulated upstream articles 202 (i.e., the slugs) are a summation of individual length "L" of upstream articles 202 accumulated over a period of time. The timing control module 160 re-computes a release time according to the cumulative length "C" of the slugs in order to override the predefined release time which causes an idle wait time for other upstream conveyors.

Figure 4A:
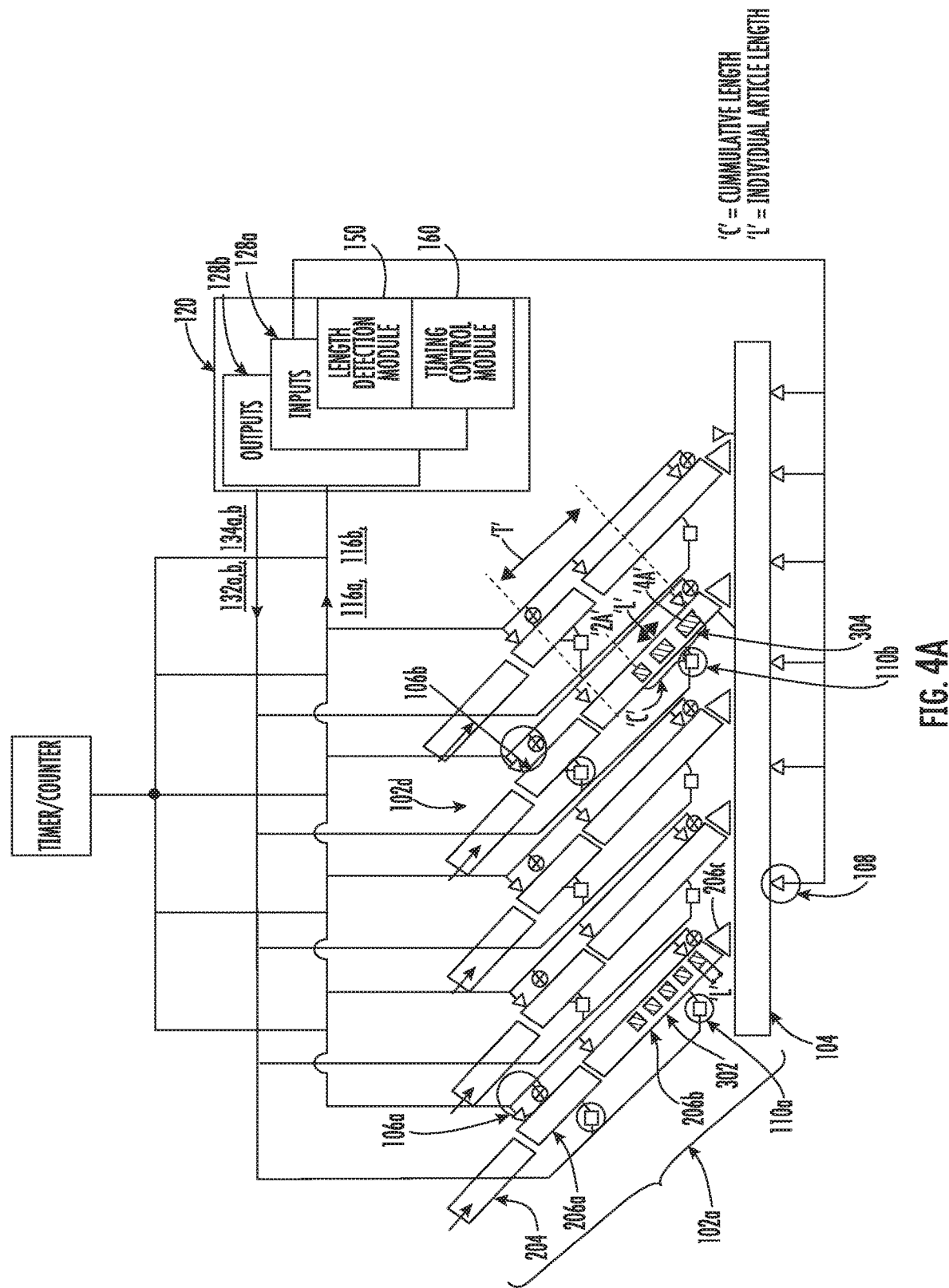
FIGS. 4A and 4B illustrate a diagrammatic plan view of a merge subsystem operating in a wedge merge mode to optimize release times of upstream articles accumulated on the upstream conveyors, according to an embodiment.
Figure 4B:
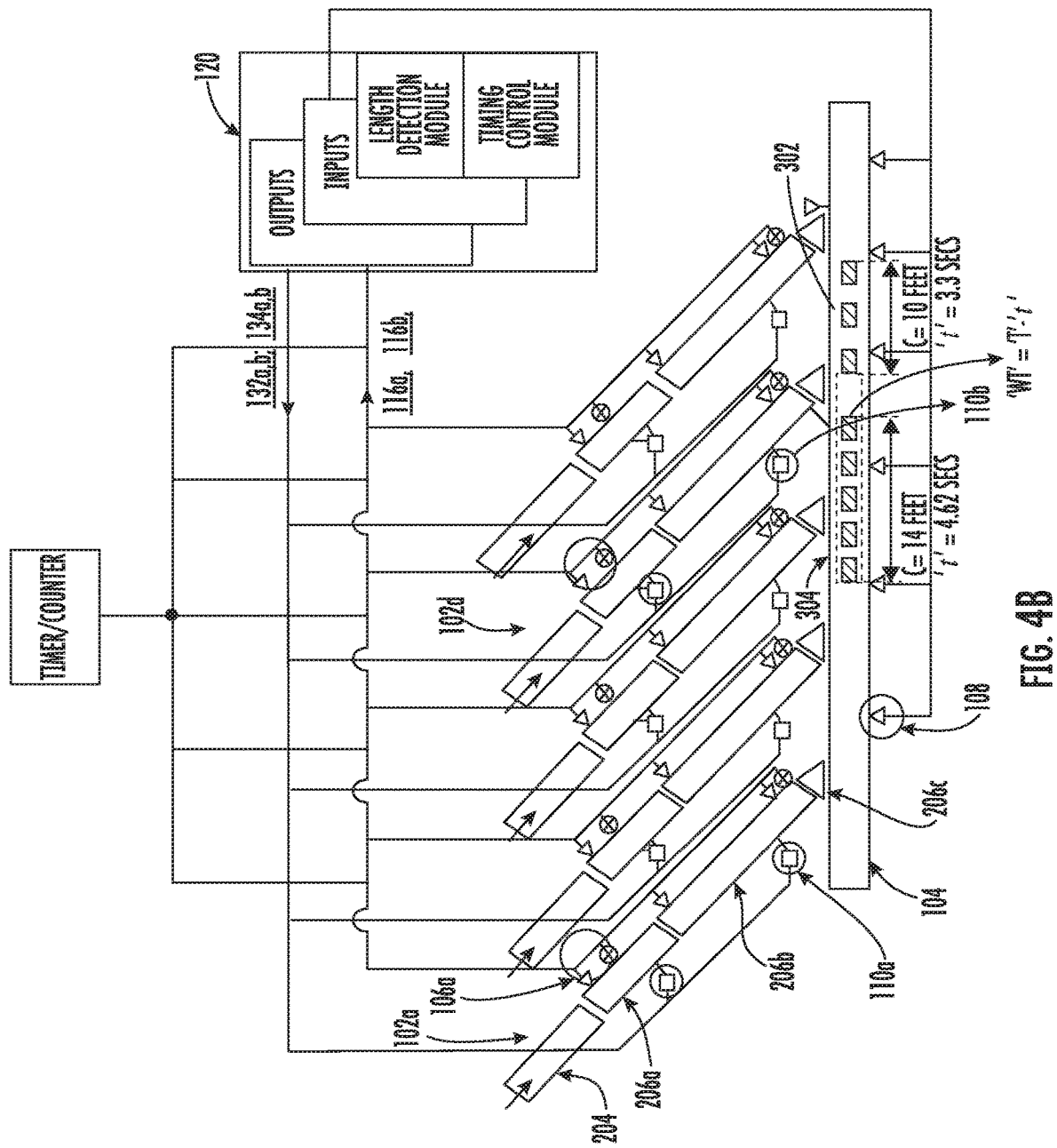

FIGS. 4A and 4B illustrates a diagrammatic plan view of a merge subsystem operating in a wedge merge mode to optimize release times of upstream articles accumulated on the upstream conveyors, according to an embodiment. FIGS. 4A and 4B replicate the arrangement of the merge subsystem 200 of FIG. 2A except that the operation of the merge subsystem is in a wedge merge mode.

For the purpose of simplicity and clarity, operation of the merge subsystem 300 in accordance with the present subject matter is explained in conjunction with only two upstream conveyors 102a, and 102n (as shown in FIG. 1), however, those skilled in the art will appreciate that the present subject matter may be enabled with multiple upstream conveyors of the merge subsystem 200. The value of n, for example, may be b, c, d, e and f, wherein the letters represents the number of upstream conveyors in the merge subsystem 300. For the purpose of illustration and ease of understanding, the nth upstream conveyor 102n (as shown in FIG. 1) is assumed to be the fourth upstream conveyor 102d (as shown in FIG. 3A), hereinafter throughout the description.

With reference to FIG. 4B, one or more input signals such as the first input signal 116a and a second input signal 116b as shown in FIG. 1 from the first set of upstream sensors 106a and the second set of upstream sensors 106b may be received by the controller 110 via an input component 128a. In another example, these input signals 116a, 116b may be provided from the first set of upstream sensors 106a and the second set of upstream sensors 106b of the first upstream conveyor 102a and the fourth upstream conveyor 102d to the length detection module 150 until a predetermined number of articles have traveled past the these upstream sensors 106a, 106b. In an example, the predetermined number of articles is indicative of the first article wave and the second article wave to be accumulated on the first and fourth upstream conveyors 102a, 102d and subsequently released on the downstream conveyor 104 at a given point of time. For example, first article wave containing five (5) articles may be released from the first upstream conveyor 102a and second article wave containing three (3) articles may be released from fourth upstream conveyor 102d.

After the controller 120 receives the one or more input signals, the controller 120 may process the one or more input signals 214a using a length detection module 150. As a result of the processing, the length detection module 150 generates one or more output signals such as the first output signal 152 and the second output signal 154 (as shown in FIG. 1), which are transmitted to the timing control module 160 which in turn performs a computation on the transmitted first output signal 152 and the second output signal 154. The timing control module 160 after performing the computations may produce third output signals 162 as shown in FIG. 1 via an output component 128b to first set of drive motors 110a and second set of drive motors 110b disposed on each of the first upstream conveyor and the fourth upstream conveyor 102a and 102d. The first set of drive motors 110a and the second set of drive motors 110b adjusts a speed of each of the first upstream conveyor 102a and the fourth upstream conveyor 102d to release the first slug 302 and the second slug 304 in accordance with the third output signals 162. In an embodiment, the input component 128a and the output component 128b may be a part of the communication component 128, as described above with reference to FIG. 1.

For example, in FIG. 4A, the first upstream conveyor 102a includes the first slug 302 comprising 5 articles and the information pertaining to the articles in the first slug 302 is communicated to the central controller 120 by the first set of upstream sensors 106a and stored in the data sore component 122 or memory 126 (as shown in FIG. 1) of the central controller 120. The information pertaining to the upstream articles 202 may include presence and/or length of each article accumulated at the first slug 302. Optionally, the controller 120 may also receive information relating to the operating speed of the first upstream conveyor 102a. Similarly, the second set of upstream sensors 106b of the fourth upstream conveyor 102d comprising the second slug 304 communicate information pertaining to the 3 articles of the second slug 304. The information received is stored at the memory 126 in the form of look-up tables, for example, a first look-up table for the first slug 302 and a second look-up table for the second slug 304.

In an example embodiment, the information pertaining to the articles in the first slug 302 and the second slug 304 may be transmitted to the central controller 120 at a predefined time interval. For example, a timer/counter circuit 208 may be communicably coupled to the first set of upstream sensors 106a and the second set of upstream sensors 106b of the first upstream conveyor 102a and the fourth upstream conveyor 102d to define a predefined time interval at which the each of these upstream sensors 106a, 106b of the first upstream conveyor 102a and the fourth upstream conveyor 102d must start to record and stop to record the information of the articles in the first slug 302 and the second slug 304. According to another embodiment, the information may be transmitted to the central controller 120 from these upstream sensors 106a, 106b of the first upstream conveyor 102a and the fourth upstream conveyor 102d after a predetermined number of upstream articles 202 have traveled passed these upstream sensors 106a, 106b of the first upstream conveyor 102a and the fourth upstream conveyor 102d. For example, a timer/counter circuit 208 may be communicably coupled to these upstream sensors 106a, 106b to define a predetermined count for the upstream articles 202. After the predetermined count is reached, these upstream sensors 106a, 106b may stop to record the information of the upstream articles 202 and transmit the information to the central controller 120.

According to an embodiment, the length detection module 150 may be activated after the predefined time interval or after the predetermined count of upstream articles 202 have traveled passed the first set and second set of upstream sensors 106, 106b and built a first slug 302 and second slug 304 on the first upstream conveyor 102a and the fourth upstream conveyor 102d, respectively. Upon activation, the length detection module 150 may access the look-up tables stored at the memory 126 of the central controller 120 to perform computations on the information stored in the look-up tables. For example, the computations include obtaining a cumulative length "C" of upstream articles on the first slug 302 by summation of individual article length values "L" on the first slug 302 and a cumulative length "C" of upstream articles 202 on the second slug 304 by summation of individual article length values "L" on the second slug 304.

For example, consider the look-up tables containing the information of 3 upstream articles on the second slug 304. The information of 3 upstream articles may include the information pertaining to individual length values "L" of each of the last 3 articles traveled past the second set of upstream sensors 106b. The length values of the 3 articles may be "4 A", "2 A", "4 A" respectively, wherein "A" corresponds to a measurement of length in either inches or feet. The length detection module 150 of the controller 120 may access these length values and perform computations on these length values, such as summation of these length values, to arrive at a cumulative length "C" of the upstream articles on the second slug 304. According to the example explained herein, the cumulative length value is "10 A". In this regard, the length detection module 150 may calculate the cumulative length "C" of upstream articles 202 on both the first slug 302 and the second slug 304 and relay the cumulative length "C" of upstream articles 202 to the timing control module 160 as a first output signal 152 and a second output signal 154 as shown in FIG. 1.

The timing control module 160 receives the first output signal 152 and the second output signal 154 indicative of the cumulative length "C" of the upstream articles on the first slug 302 and the second slug 304 and performs a computation based on the first output signal 152 and the second output signal 154. Further, the timing control module 160 fetches additional information from the look-up tables stored in the memory 126 and performs the computations. For example, the additional information may include the operating speed of both the first upstream conveyor 102a and the fourth upstream conveyor 102d stored in the look-up tables. Therefore, the timing control module 160 utilizes the first output signal 152, the second output signal 154 along with the additional information from the look-up tables stored in the memory 126 to produce third output signals 162. The third output signals 162 are obtained as a result of computations performed on the first output signal 152, the second output signal 154, and the additional information. The third output signals 162 are indicative of a first release time and a second release time calculated for the first upstream and the fourth upstream conveyor 102a, 102d for releasing the first slug 302 and the second slug 304 on to the downstream conveyor 104.

As discussed previously, the timing control module 160 performs a computation upon receiving the cumulative length "C" of the first slug 302 and the second slug 304 and speed of operation of the first and fourth upstream conveyors 102a, 102d to re-compute release times "t" for each of these upstream conveyors 102a, 102d. For example, the cumulative length "C" of first set of upstream articles 202a (i.e., the first slug) on the first upstream conveyor 102a be 14 A and the second set of upstream articles 202b (i.e., the second slug) on the fourth upstream conveyor 102d be 10 A, where A corresponds to measurement in terms of feet and speed of operation of the first and fourth upstream conveyors 102a, 102d be 180 feet/min. As shown in FIG. 4B, upon receiving the cumulative length "C" and the speed, the timing control module 160 begins computation by using the formula (release time (t)=cumulative length (C)/speed of operation), which in this example, is calculated as release time "t" of fourth upstream conveyor=10 feet/180 feet/min, which is equal to 0.055 minutes (e.g., 3.3 seconds). Therefore, the release time for releasing the second slug 304 from the fourth upstream conveyor 102d is 3.3 seconds. Further, the release time of the first upstream conveyor 102a is computed to be 14 feet/180 feet/min=0.077 minutes=4.62 seconds. These release times of the upstream conveyors 102a, 102d are communicated as third output signals 162 and the controller 120 upon receiving the third output signals 162 issues a first and second command signal 132a, 134a (as shown in FIG. 1) and a first and second timing control signal 132b, 134b (as shown in FIG. 1) to control first and second set of drive motors 110a, 110b of the first and the fourth upstream conveyor 102a, 102d to release all of the first and second slug 132, 134 based on the third output signals 162. In this regard, the idle wait time is eliminated as the controller 120 is aware of the release times of each upstream conveyor 102a, 102d and releases each upstream conveyor 102a, 102d only for the computed release times. Therefore, as shown in FIG. 4B, the idle wait time "WT" is reduced and the first slug 302 no longer waits or the completion of release adjustment time "T" as the controller 120 is aware of the cumulative length "C" of the second slug 304 and the first slug 302. Thus, the cumulative length "C" and the operating speed aids the controller 120 to decide when to release slugs from the upstream conveyors without any collision and with any idle wait time. In an example, the release of slugs from the upstream conveyors may be released based on a priority or may happen sequentially in the order of arrangement of the upstream conveyors. The priority for choosing the upstream conveyors for release of the upstream articles may be based, for example, on a particular destination for a given vehicle (such as a semi-trailer, airplane, etc.) or based on different classes of articles intended for the same destination.

Aspects of the present subject matter are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by a controller of the material handling system. For example, the controller may utilize a functional logic stored in remote computing device to execute instructions which dynamically cause the controller to predict dimensions of articles and time the release of the articles in spaces corresponding to the predicted dimensions. In various embodiments, the operations of the method may be performed by any type of computing device, such as a laptop computer and/or a server. Additionally, the various operations may be described as being performed by a processor coupled to the controller, however those with skill in the art should appreciate that the computing device associated with a material handling system may perform the operations via the controller.

Figure 5:
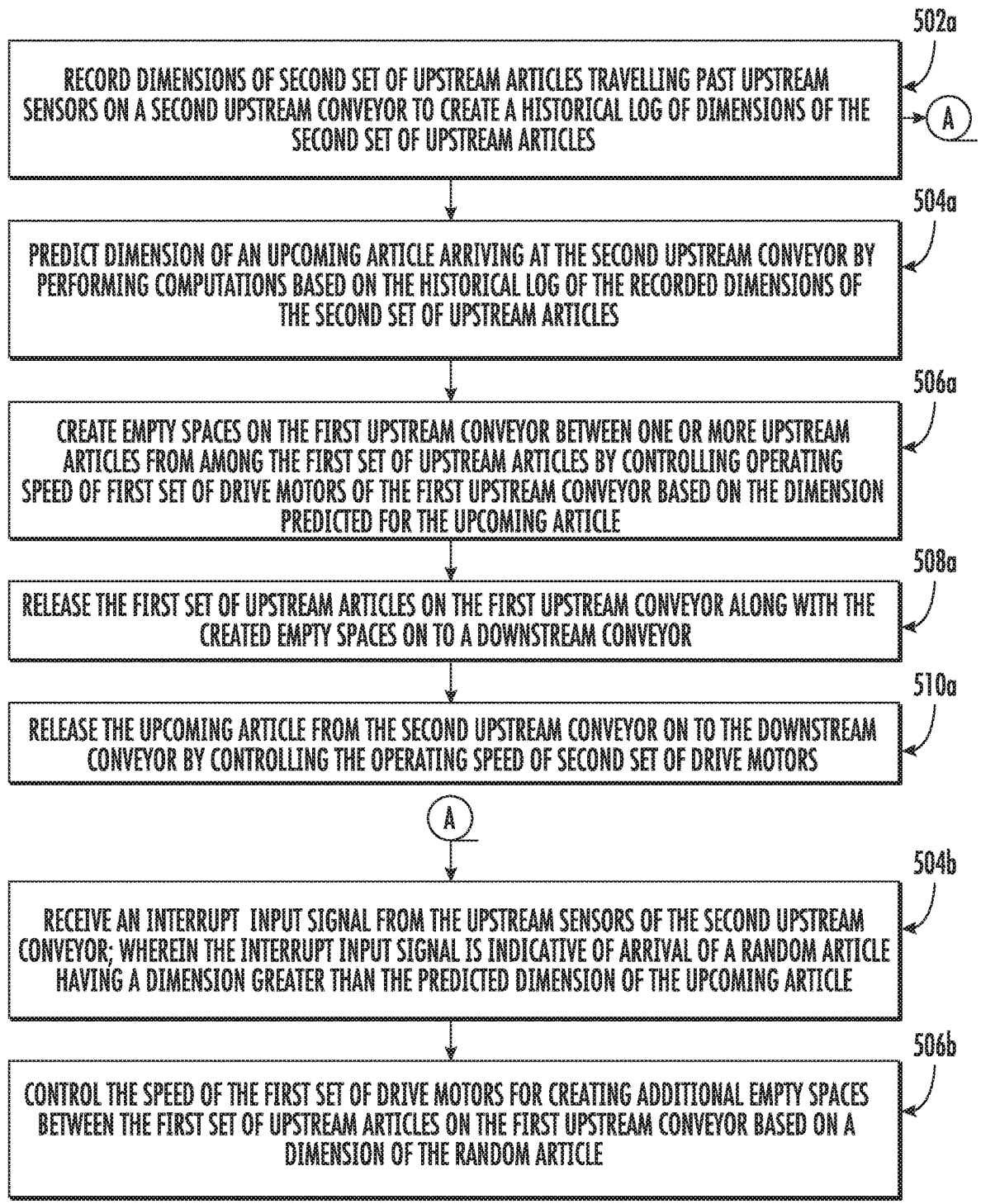
FIG. 5 is an exemplary flow diagram 500 illustrating a method for controlling release of upstream articles from upstream conveyors into empty spaces on downstream conveyor according to one or more embodiments.

FIG. 5 is an exemplary flow diagram 500 illustrating a method for controlling release of upstream articles from upstream conveyors into empty spaces on downstream conveyor according to one or more embodiments. In block 502a, the method includes recording dimensions of second set of upstream articles travelling past upstream sensors of a second upstream conveyor. The dimensions are recorded by the central controller to create an historical log of dimensions for the second set of upstream articles. In an example, the recording of the dimensions may occur when the second set of upstream articles passes along a conveyor section of metering conveyors or staging conveyors of the second upstream conveyor by upstream sensors such as photo eye sensors. In another example, the recording of the dimensions may occur when the second set of upstream articles may be transiting from a conveyor section of an accumulation conveyor to a conveyor section of the metering conveyor. The dimensions of second set of articles may be recorded over a period of time. In an example embodiment, recording of the dimensions of the second set of articles occurs during a pre-set time or up to a predetermined count value determined by the timer/counter circuit and communicated to the upstream sensors.

After recording the dimensions of the second set of upstream articles, in block 504a, the method further includes predicting dimension of an upcoming article arriving at the second upstream conveyor by performing computations based on the historical log of the recorded dimensions of the second set of upstream articles. In an example, predicting the dimension of the upcoming article involves performing a computation on the recorded dimensions of the second set of upstream articles to derive the predicted dimension. In an example, the dimension of the upcoming article is computed before the arrival of the upcoming article on the second upstream conveyor. For example, the computing involves one of finding an article whose length value is the largest among the second set of articles or computing the average length value of the last three articles from among the second set of upstream articles released on to the downstream conveyor or monitoring the length value of upstream articles having recurring length values consequently over a period of time.

Further, in block 506a, the method includes creating empty spaces on the first upstream conveyor between one or more upstream articles from among a first set of upstream articles by controlling a speed of first set of drive motors of the first upstream conveyor based on the predicted dimension for the upcoming article. The dimension of the empty spaces is greater than or equal to the predicted dimension for the upcoming article. In an example, controlling the speed of the first upstream conveyor includes increasing or decreasing the speed of the first set of drive motors of the first upstream conveyor. According to an embodiment, the controlling of the speed may occur when the first set of upstream articles are conveyed along the conveying surface of the metering conveyors. According to another embodiment, the controlling of the speed may occur when the first set of upstream articles are conveyed along the conveying surface of the staging conveyors. Controlling the speed of the first upstream conveyor may include driving the first set of drive motors of the metering conveyor and the staging conveyor at different speeds in order to position the first set of upstream articles in order to create the empty spaces.

According to example embodiment, the empty spaces may comprise an inter-article gap pre-existing between one or more articles of the first set of upstream articles. These inter-article gaps may be constant gaps. When driving the first set of drive motors at a constant speed, inter-article gaps are maintained between the first set of upstream articles. In addition to the inter-article gaps, when creating the empty spaces of dimension corresponding to the predicting dimension of the upcoming article, driving the first set of drive motors at a different speed may be required. In an example, the empty spaces may be created by controlling the speed of the first set of drive motors of the metering conveyors and the inter-article gaps may be created by controlling the speed of the first set of drive motors of the stating conveyors. In this regard, the speed of the first set of drive motors on the first upstream conveyor may be operated at varying speeds depending on the predicted dimension of the upcoming article.

Further, in block 508a, the method further includes releasing the first set of upstream articles on the first upstream conveyor along with the created empty spaces on to a downstream conveyor. According to an embodiment, the empty spaces existing between the first set of upstream articles are maintained a constant when releasing the first set of upstream articles into the downstream conveyor. In this regard, releasing the first set of upstream articles includes conveying the articles from the conveying surface of the staging conveyor to the conveying surface of the downstream conveyor, such as, a takeaway conveyor. After releasing the first set of upstream articles, in block 510a, the method further includes releasing the upcoming article from the second upstream conveyor on to the downstream conveyor by controlling speed of second set of drive motors. The release of the upcoming article is timed to place the upcoming article on the empty spaces created between the first set of upstream articles released on the downstream conveyor. Illustratively, the releasing of the upcoming article includes selectively driving the second set of drive motors of the staging conveyor of the second upstream conveyor. The selective driving involves pausing the operation of the second set of drive motors until the arrival of the created empty spaces at a discharge end of the second upstream conveyor and initiating the operation of the second set of drive motors upon the arrival of the created empty spaces sensed by downstream sensors of the downstream conveyor. According to an embodiment, releasing the upcoming article may involve releasing the upcoming article based on pre-defined time intervals. The predefined time intervals may be derived based on the timing of release of the articles from the second upstream conveyor. The predefined time intervals may be an input to the second set of drive motors for releasing the upcoming articles at regular time intervals so that they are accurately placed on the created empty spaces existing between the first set of upstream articles.

According an embodiment, after recording the dimensions of first set of upstream articles on the first upstream conveyor at block 502a, the method further includes, at block 504b, receiving an interrupt input signal from second set of upstream sensors of the second upstream conveyor. The interrupt input signal is indicative of arrival of a random article having a dimension greater than the predicted dimension of the upcoming article. In an example, when creating empty spaces of dimension equal to the dimension of the upcoming article, a random article having a dimension greater than the predicted dimension for the upcoming article may be encountered. In such a scenario, the creation of empty spaces may be paused by stopping the operation of the first set of drive motors of the first upstream conveyor. Further, at block 506b, the method further includes controlling the speed of the first set of drive motors for creating additional empty spaces between the first set of upstream articles on the first upstream conveyor based on a dimension of the random article. The dimension of the additional empty spaces is greater than or equal to the dimension for the random article. In the example, the creation of the additional empty spaces may be initiated by operating the first set of drive motors in accordance with the dimension of the random article. In this regard, empty spaces between articles are introduced by controlling the speed of the first set of drive motors at the first upstream conveyor in accordance with the dimensions of the articles arriving at the second upstream conveyor.

By way of example, the predicted dimension for the upcoming article may include a predicted length value of six (6) inches. Accordingly, an empty space of 6 inches may be created in between the articles on the first upstream conveyor. In another example, if the length value of the random article is fifteen (15) inches, then it is observed that the length value of the random article is greater than the predicted length value of the upcoming article by the second set of upstream sensors. In this regard, an additional empty space of 15 inches is created between the articles on the first upstream conveyor. Accordingly, a pair of empty spaces may be created based on the predicted length value for the upcoming article and the length value obtained for the random article. In yet another example, if the articles travelling in the upstream conveyors have a minimum inter-article gap between them, for example three (3) inches, the predicted length value of the upcoming article may be 6 inches. Therefore, an extra gap of 3 inches may be created in addition to the empty space of 6 inches between the articles in order to maintain the minimum inter-article gap between the articles. In this manner, multiple empty spaces may be created in an upstream conveyor in accordance with the dimension of articles arriving at other upstream conveyors.

Figure 6A:
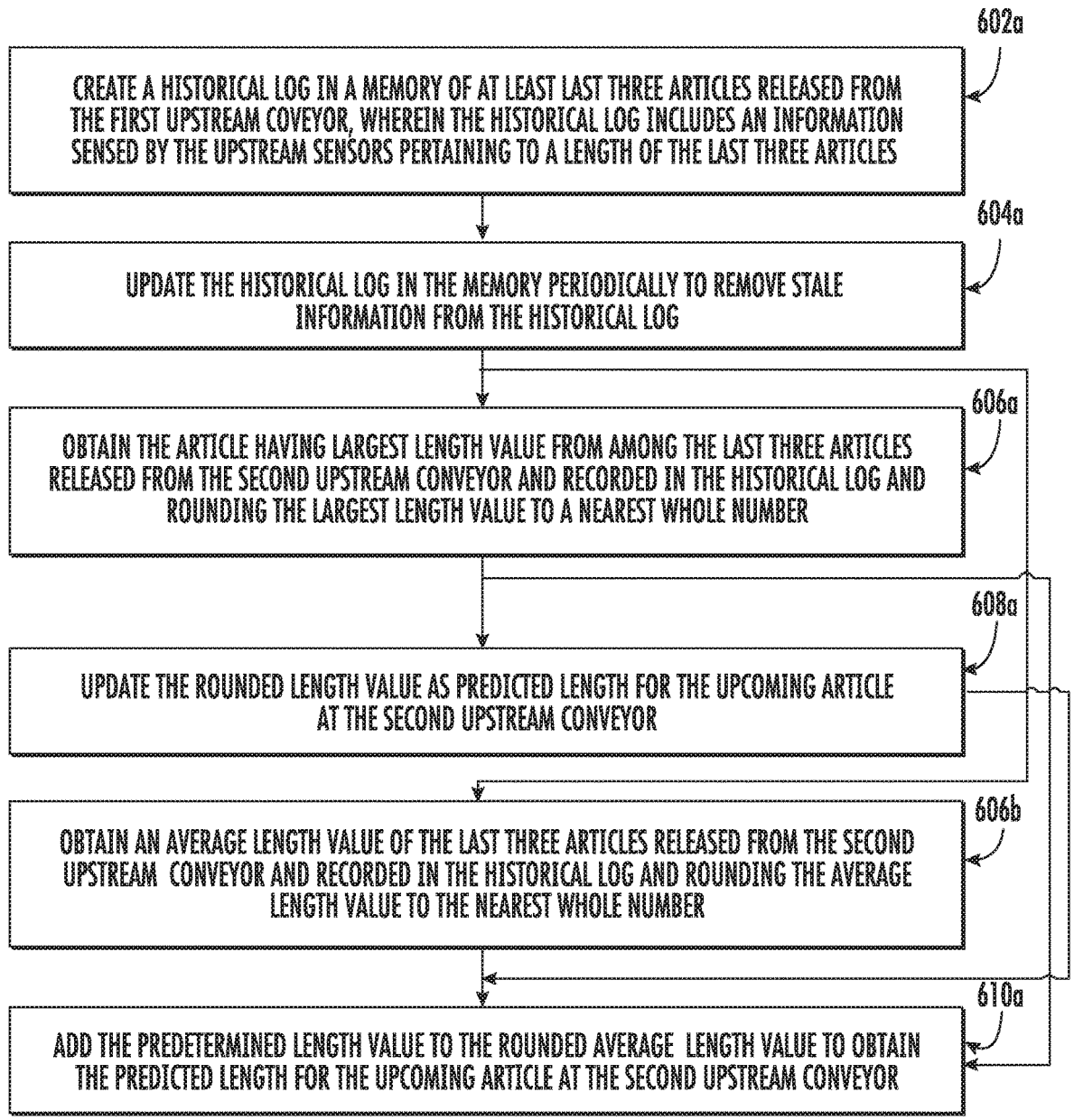
FIGS. 6A and 6B are exemplary flow diagrams illustrating a method for predicting dimension of upcoming articles according to one or more example embodiments.
Figure 6B:
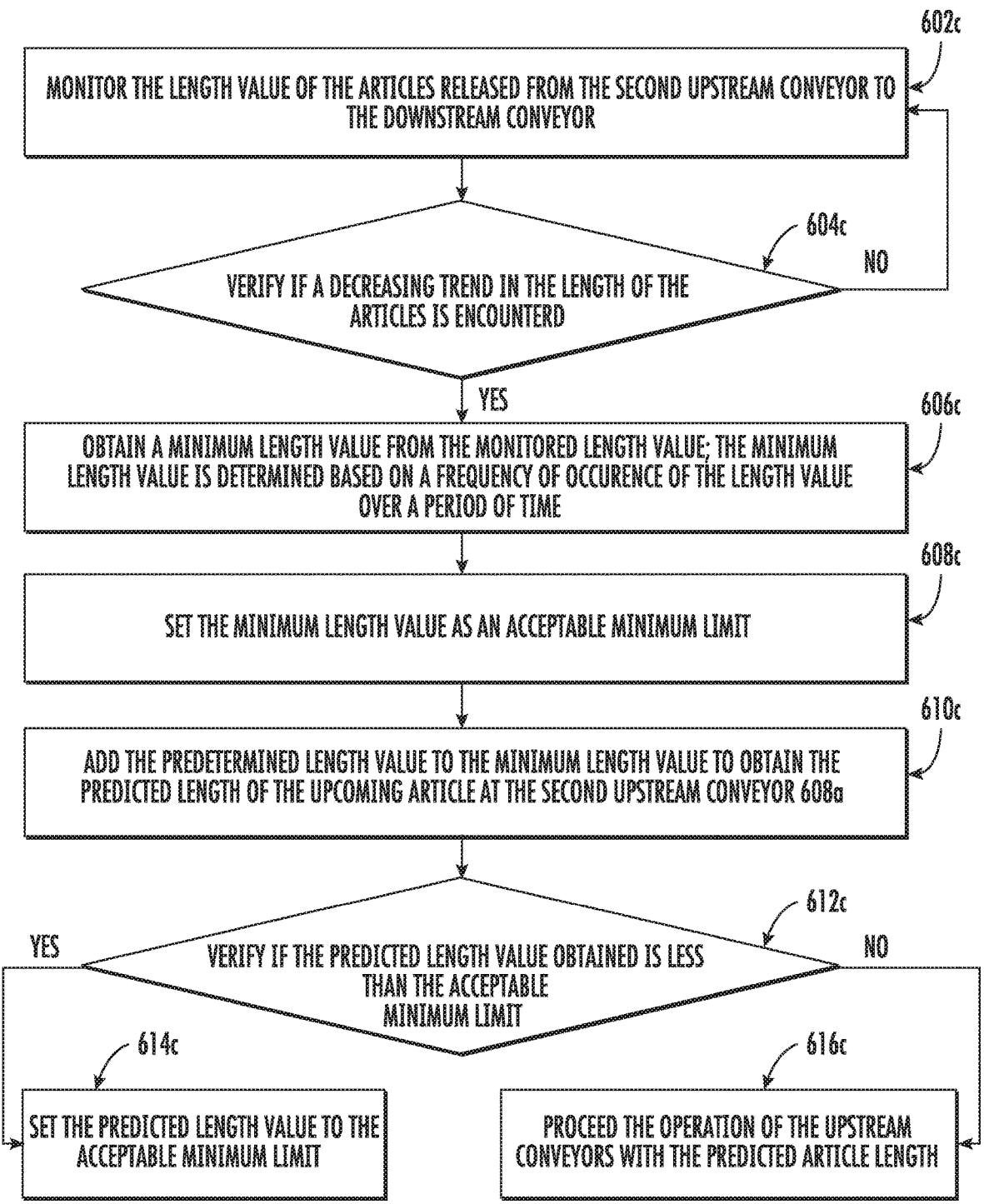

FIGS. 6A and 6B are exemplary flow diagrams illustrating a method for predicting dimension of upcoming articles according to one or more example embodiments. As shown in FIG. 6A, at block 602a, the method includes creating an historical log in a memory of at least last three articles released from the first upstream conveyor. The historical log includes an information sensed by the upstream sensors pertaining to a length of the last three articles. The historical log may be stored in the form of a look-up table in the memory. The look-up table is periodically refreshed or updated at predetermined interval of time.

Further, at block 604a, the method further includes updating the historical log in the memory periodically to remove stale information from the historical log, wherein the stale information corresponds to a first entry in the look-up table containing information of an oldest article released from the second upstream conveyor. Updating the historical log may involve monitoring the look-up table for stale information and removing the stale information exceeding a timing threshold. The timing threshold may be a maximum time beyond which the information recorded in the historical log may be discarded during a calculation of the dimension of the upcoming article. The timing threshold may be a static time or a dynamic time. In an example, the stale information may be flagged and may not be used in calculating the dimension for the upcoming article.

Further, updating the historical log includes adding the information of an article currently released from the second upstream conveyor in order to update the historical log. In other words, the historical log is updated by replacing the stale information pertaining to a released article with the information of a latest released article at the time of calculating the dimension of the upcoming article. After executing the method step at block 604*a*, the step 606*a* or 606*b* may be executed by the method (e.g., a controller). When at block 606*a*, the method further includes obtaining the article having largest length value from among the last three articles released from the second upstream conveyor and recorded in the historical log and rounding the largest length value to a nearest whole number. According to an embodiment, after obtaining the largest length value, block 608*a* or 610*a* may be executed. At block 608*a* the method further includes updating the rounded length value as predicted length for the upcoming article at the second upstream conveyor. At block 610*a* the method further includes adding a predetermined length value to the rounded length value to obtain the predicted length for the upcoming article at the second upstream conveyor Further, when at block 606*b*, the method further includes obtaining an average length value of the last three articles released from the second upstream conveyor and recorded in the historical log and rounding the average length value to the nearest whole number. According to an embodiment, after obtaining the average length value, block 610*a* or 608*a* may be executed. At block 610*a*, the method further includes adding a predetermined length value to the rounded length value to obtain the predicted length for the upcoming article at the second upstream conveyor and at block 608*a*, the method further includes updating the rounded length value as predicted length for the upcoming article at the second upstream conveyor. As shown in FIG. 6B, at block 602*c*, the method includes monitoring the length value of the articles released from the second upstream conveyor to the downstream conveyor. For example, the monitoring may include monitoring a gradual change in length of the articles that are being added and removed from the look-up table over a period of time. At block 604*c*, verifying if a decreasing trend in the length of the articles is encountered, then, at block 606*c*, obtaining a minimum length value from the monitored length value. The minimum length value is determined based on a frequency of occurrence of the length value over a period of time.

For example, if the articles arriving at the second upstream conveyor have length values of nine (9) inches, eight (8) inches, six (6) inches, three (3) inches, etc., it is observed that there is a decreasing trend in the length of the articles. For example, if articles having a length of 3 inches arrive at the second upstream conveyor over a period of time and it is observed from the look-up table that the length of 3 inches have occurred a maximum number of times than the other articles of other varying lengths, then the length value of 3 inches is set as the minimum length value.

At block 608*c*, the method further includes setting the minimum length value as an acceptable minimum limit. The acceptable minimum limit may be a minimum threshold limit set for the length of the articles arriving at the second upstream conveyor. At block, 610*c*, the method further includes adding the predetermined length value to the minimum length value to obtain the predicted length of the upcoming article at the second upstream conveyor. Further, at block 612*c*, the method includes verifying if the predicted length value obtained at block 610*c* is less than the acceptable minimum limit, if the result of verification is YES, then, at block 614*c*, setting the predicted length value to the acceptable minimum limit. Further, if the result of verification is NO, then, at block 616*c* proceeding the operation of the upstream conveyors with the predicted length value obtained at block 610*c*.

Figure 6C:
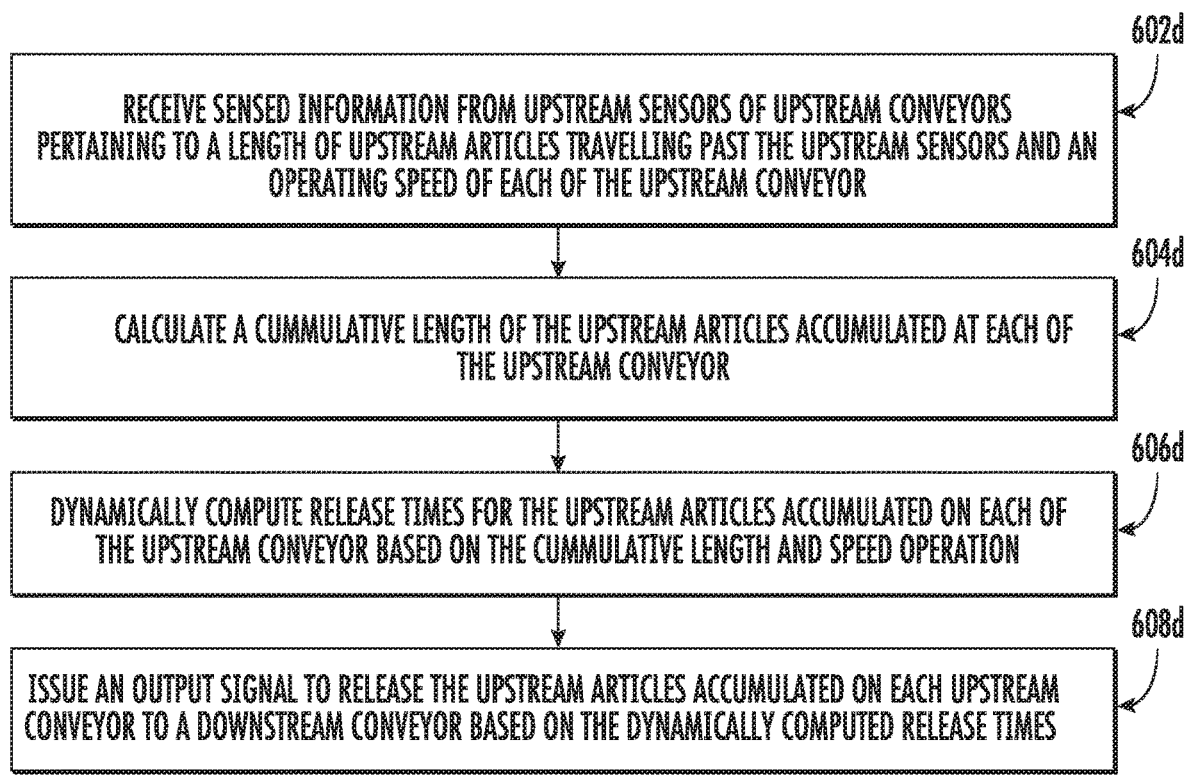
FIG. 6C illustrates an exemplary flow diagram illustrating a method of computing release times for upstream articles accumulated on upstream conveyors according to one or more example embodiments.

FIG. 6C illustrates an exemplary flow diagram illustrating a method of computing release times for upstream articles accumulated on upstream conveyors according to one or more example embodiments. As shown in FIG. 6, at step 602*d*, the method includes receiving information from the upstream sensors of the upstream conveyors pertaining to a length of upstream articles travelling past upstream sensors and a speed of operation of each of the upstream conveyor. For example, the information is received from each of the upstream conveyors, for example, a first upstream conveyor and a second upstream conveyor. The information is sensed each time an article on the first or second upstream conveyor travels past the upstream sensors. In an example, the information may be a length of each upstream article computed by sensing a leading edge of the article and trailing edge of the article and calculating the distance between the leading edge and the trailing edge, the distance will be proportional to the length of the upstream article. The information may also include a speed of operation of the first upstream conveyor and the second upstream conveyor. In an example, operating speeds of accumulation conveyors, metering conveyors, and staging conveyors may be recorded individually and transmitted to a data store component or memory of the controller. Further, at step 604*d*, after receiving the information, the method includes calculating a cumulative length of upstream articles accumulated at each of the upstream conveyor. For example, calculating the cumulative length is performed by a length detection module that fetches the information from the data store component or memory of the controller and performs summation of the individual length of each upstream article on the first upstream conveyor and the second upstream conveyor.

The fetching of the information occurs by accessing look-up tables in a memory created for the first upstream conveyor and the second upstream conveyor, wherein each look-up table comprises the information from the upstream sensors of each upstream conveyor. The summation of individual lengths of the upstream articles provides a cumulative length of the upstream articles accumulated in the first upstream conveyor and the second upstream conveyor. In an example, a first set of upstream articles form a first slug on the first upstream conveyor and a second set of upstream articles form a second slug on the second upstream conveyor. The cumulative length of the first slug is the summation of length of individual upstream articles of the first set of upstream articles that the forms the first slug and the cumulative length of the second slug is the summation of length of individual upstream articles of the second set of upstream articles that the forms the second slug. Further, at step 606*d*, the method includes dynamically computing release times for the upstream articles accumulated on each of the upstream conveyor based on the cumulative length and speed of operation. For example, the computing of release times is performed by a timing control module of the controller.

The timing control module may fetch the cumulative length of the first slug and the second slug from the length detection module as discussed at step 604*d* and fetch the sensed informed pertaining to the speed of operation of the first upstream conveyor and the second upstream conveyor from the data store component or memory as discussed at step 602*d*. The timing control module using the formula (release time=cumulative length/speed of operation) to calculate a first release time for the first upstream conveyor and a second release time for the second upstream conveyor. The timing control module may transmit the first release time and the second release time to the controller. After the controller receives the first release time and the second release time, the method at step 608*d* includes issuing an output signal to release the upstream articles accumulated on each upstream conveyor to a downstream conveyor based on the dynamically computed release times. For example, issuing the output signal includes the controller transmitting a first command signal to release the first slug and a first timing control signal to drive first set of drive motors of the first upstream conveyor to release the first slug at the computed first release time. Similarly, a second command signal and a second timing control signal is transmitted to the second upstream conveyor to release the second slug from the second upstream conveyor.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method for article release management, the method comprising:
   recording a dimension of each article in a second set of upstream articles travelling past one or more upstream sensors on a second upstream conveyor in order to create an historical log of the dimensions of each article in the second set of upstream articles;
   predicting a dimension of an upcoming article arriving at the second upstream conveyor by performing computations based on the historical log of the recorded dimensions of the second set of upstream articles;
   creating one or more empty spaces on a first upstream conveyor between one or more upstream articles from among a first set of upstream articles by controlling an operating speed of a first set of drive motors of the first upstream conveyor based on the predicted dimension for the upcoming article, wherein a dimension of the one or more empty spaces is greater than or equal to the predicted dimension of the upcoming article;

releasing the first set of upstream articles on the first upstream conveyor with the one or more created empty spaces on to a downstream conveyor; and releasing the upcoming article from the second upstream conveyor on to the downstream conveyor by controlling an operating speed of a second set of drive motors such that the upcoming article is placed in one or more of the empty spaces created between the one or more upstream articles released on to the downstream conveyor.

2. The method as claimed in claim 1, further comprising:

receiving an interrupt input signal from the one or more upstream sensors of the second upstream conveyor, wherein the interrupt input signal indicates arrival of a random article having a dimension determined to be greater than the predicted dimension of the upcoming article; and controlling the operating speed of the first set of drive motors to create additional empty space between the first set of upstream articles on the first upstream conveyor based on a determined dimension of the random article, wherein a dimension of the empty space and the additional empty space is greater than or equal to the determined dimension for the random article.

3. The method as claimed in claim 1, wherein the upcoming article defines a subset of the second set of upstream articles waiting to travel past the one or more upstream sensors of the second upstream conveyor.

4. The method as claimed in claim 1, wherein the dimension comprises one of a length value or a width value of the second set of upstream articles.

5. The method as claimed in claim 1, wherein predicting the dimension of the upcoming article further comprises:

creating an historical log in a memory of at least the last three articles released from the second upstream conveyor, wherein the historical log includes a length of each of the last three articles sensed by the one or more upstream sensors, and wherein the historical log is stored in the form of a look-up table in the memory;

updating the historical log in the memory periodically to remove stale information from the historical log, wherein the stale information corresponds to a first entry in the look-up table containing information of an oldest article released from the second upstream conveyor;

obtaining the article having a largest length value from among the last three articles released from the second upstream conveyor and recorded in the historical log and rounding the largest length value to a nearest whole number; and updating the rounded length value as predicted length for the upcoming article at the second upstream conveyor.

6. The method as claimed in claim 1, wherein predicting the article dimension of the upcoming article further comprises:

creating an historical log in a memory of at least the last three articles released from the second upstream conveyor, wherein the historical log includes a length of each of the last three articles sensed by the one or more upstream sensors, and wherein the historical log is stored in the form of a look-up table in the memory;

updating the historical log in the memory periodically to remove stale information from the historical log, wherein the stale information corresponds to a first entry in the look-up table containing information of an oldest article released from the second upstream conveyor;

obtaining the article having a largest length value from the last three articles released from the second upstream conveyor and recorded in the historical log and rounding the largest length value to the nearest whole number; and adding a predetermined length value to the rounded length value to obtain the predicted length for the upcoming article at the second upstream conveyor.

7. The method as claimed in claim 1, wherein predicting the article dimension of the upcoming article further comprises:

creating an historical log in a memory of at least the last three articles released from the second upstream conveyor, wherein the historical log includes a length of each of the last three articles sensed by the one or more upstream sensors, and wherein the historical log is stored in the form of a look-up table in the memory;

updating the historical log in the memory periodically to remove stale information from the historical log, wherein the stale information corresponds to a first entry in the look-up table containing information of an oldest article released from the second upstream conveyor;

obtaining an average length value of the last three articles released from the second upstream conveyor and recorded in the historical log and rounding the average length value to the nearest whole number; and updating the rounded length value as predicted length for the upcoming article at the second upstream conveyor.

8. The method as claimed in claim 1, wherein predicting the article dimension of the upcoming article further comprises:

creating an historical log in a memory of at least the last three articles released from the second upstream conveyor, wherein the historical log includes a length of each of the last three articles sensed by the one or more upstream sensors, and wherein the historical log is stored in the form of a look-up table in the memory;

updating the historical log in the memory periodically to remove stale information from the historical log, wherein the stale information corresponds to a first entry in the look-up table containing information of an oldest article released from the second upstream conveyor;

obtaining the average length value of the last three articles released from the second upstream conveyor and recorded in the historical log and rounding the average length value to the nearest whole number; and adding the predetermined length value to the rounded average length value to obtain the predicted length for the upcoming article at the second upstream conveyor.

9. The method as claimed in claim 1, wherein predicting the article dimension of the upcoming article further comprises:

monitoring the length value of the articles released from the second upstream conveyor to the downstream conveyor, wherein when a decreasing trend in the length value of the articles is encountered:

obtaining a minimum length value from the monitored length value, wherein the minimum length value is determined based on a frequency of occurrence of the minimum length value over a period of time;

setting the minimum length value as an acceptable minimum limit; and adding the predetermined length value to the minimum length value to obtain the predicted length of the upcoming article at the second upstream conveyor.

10. The method as claimed in claim 1, wherein predicting the article dimension of the upcoming article further comprises:
creating an historical log in a memory of at least the last three articles released from the second upstream conveyor, wherein the historical log includes a length of each of the last three articles sensed by the one or more upstream sensors, and wherein the historical log is stored in the form of a look-up table in the memory;
updating the historical log in the memory periodically to remove stale information from the historical log, wherein the stale information corresponds to a first entry in the look-up table containing information of an oldest article released from the second upstream conveyor;
obtaining the article having a largest length value from among the last three articles released from the second upstream conveyor and recorded in the historical log and rounding the largest length value to the nearest whole number; and
adding the predetermined length value to the rounded length value to obtain the predicted length for the upcoming article at the first upstream conveyor, wherein in an instance in which the predicted length is less than the acceptable minimum limit, setting the predicted length to the acceptable minimum limit.

11. The method as claimed in claim 5, wherein the stale information is an information exceeding a timing threshold, and wherein the timing threshold comprises a maximum time beyond which the recorded information in the historical log may be discarded during a calculation or prediction of the dimension of the upcoming article.

12. The method as claimed in claim 5, wherein periodically updating the historical log in the memory further comprises refreshing the historical log to include entries in the look-up table corresponding to the latest released articles from the second upstream conveyor.

13. The method as claimed in claim 1, further comprising:
receiving information from one or more upstream sensors of one or more upstream conveyors including the second upstream conveyor, wherein the information comprises a length of one or more upstream articles travelling past the one or more upstream sensors and an operating speed of each of the upstream conveyors;
calculating a cumulative length of the upstream articles accumulated at each of the upstream conveyors;
dynamically computing release times for each of the upstream articles accumulated on each of the upstream conveyors based on the cumulative length and the operating speed; and
issuing an output signal to release the one or more upstream articles accumulated on each upstream conveyor to a downstream conveyor based on the dynamically computed release times.

14. A controller, comprising:
a processor; and
a memory,
wherein the processor is coupled to the memory and is configured to:
record a dimension of each article in a second set of upstream articles travelling past one or more upstream sensors on a second upstream conveyor in order to create an historical log of the dimensions of each article in the second set of upstream articles;
predict a dimension of an upcoming article arriving at the second upstream conveyor by performing computations based on the historical log of the recorded dimensions of the second set of upstream articles;
create one or more empty spaces on a first upstream conveyor between one or more upstream articles from among a first set of upstream articles by controlling an operating speed of a first set of drive motors of the first upstream conveyor based on the predicted dimension for the upcoming article, wherein the dimension of the one or more empty spaces is greater than or equal to the predicted dimension of the upcoming article;
release the first set of upstream articles on the first upstream conveyor with the one or more created empty spaces on to a downstream conveyor; and
release the upcoming article from the second upstream conveyor on to the downstream conveyor by controlling an operating speed of a second set of drive motors such that the upcoming article is placed in one or more of the empty spaces created between the one or more upstream articles released on to the downstream conveyor.

15. The controller as claimed in claim 14, wherein the controller is further configured to:
monitor a length value of the articles released from the second upstream conveyor to the downstream conveyor, wherein, in an instance in which a decreasing trend in the length value of the articles is encountered, the controller is configured to:
obtain a minimum length value from the monitored length value, wherein the minimum length value is determined based on a frequency of occurrence of the minimum length value over a period of time;
set the minimum length value as an acceptable minimum limit; and
add the predetermined length value to the minimum length value to obtain the predicted length of the upcoming article at the second upstream conveyor.

16. The controller as claimed in claim 14, wherein the controller is further configured to:
receive an interrupt input signal from the one or more upstream sensors of the second upstream conveyor, wherein the interrupt input signal indicates arrival of a random article having a dimension determined to be greater than the predicted dimension of the upcoming article; and
control the operating speed of the first set of drive motors to create additional empty space between the first set of upstream articles on the first upstream conveyor based on a determined dimension of the random article, wherein a dimension of the empty space and the additional empty space is greater than or equal to the determined dimension for the random article.

17. The controller as claimed in claim 14, wherein the controller is further configured to:
create an historical log in a memory of at least the last three articles released from the second upstream conveyor, wherein the historical log includes a length of each of the last three articles sensed by the one or more upstream sensors, and wherein the historical log is stored in the form of a look-up table in the memory;
update the historical log in the memory periodically to remove stale information from the historical log, wherein the stale information corresponds to a first entry in the look-up table containing information of an oldest article released from the second upstream conveyor;

obtain the article having a largest length value from among the last three articles released from the second upstream conveyor and recorded in the historical log and rounding the largest length value to the nearest whole number; and add the predetermined length value to the rounded length value to obtain the predicted length for the upcoming article at the first upstream conveyor, wherein in an instance in which the predicted length is less than the acceptable minimum limit, setting the predicted length to the acceptable minimum limit.

18. The controller as claimed in claim 14, wherein the controller is further configured to:

create an historical log in a memory of at least the last three articles released from the second upstream conveyor, wherein the historical log includes a length of each of the last three articles sensed by the one or more upstream sensors, and wherein the historical log is stored in the form of a look-up table in the memory;

update the historical log in the memory periodically to remove stale information from the historical log, wherein the stale information corresponds to a first entry in the look-up table containing information of an oldest article released from the second upstream conveyor;

obtain the average length value of the last three articles released from the second upstream conveyor and recorded in the historical log and rounding the average length value to the nearest whole number; and add the predetermined length value to the rounded average length value to obtain the predicted length for the upcoming article at the second upstream conveyor.

19. A material handling system, comprising:
a first upstream conveyor;
a second upstream conveyor;
a downstream conveyor; and
a controller communicably coupled to upstream sensors installed on the first upstream conveyor and the second upstream conveyor, wherein the controller is to:

record a dimension of each article in a second set of upstream articles travelling past one or more upstream sensors on a second upstream conveyor in order to create an historical log of the dimensions of each article in the second set of upstream articles;

predict a dimension of an upcoming article arriving at the second upstream conveyor by performing computations based on the historical log of the recorded dimensions of the second set of upstream articles;

create one or more empty spaces on a first upstream conveyor between one or more upstream articles from among a first set of upstream articles by controlling an operating speed of a first set of drive motors of the first upstream conveyor based on the predicted dimension for the upcoming article, wherein the dimension of the one or more empty spaces is greater than or equal to the predicted dimension of the upcoming article;

release the first set of upstream articles on the first upstream conveyor with the one or more created empty spaces on to the downstream conveyor; and release the upcoming article from the second upstream conveyor on to the downstream conveyor by controlling an operating speed of a second set of drive motors such that the upcoming article is placed in one or more of the empty spaces created between the one or more upstream articles released on to the downstream conveyor.

20. The material handling system as claimed in claim 19, wherein the upstream sensors of the second upstream conveyor are configured to transmit an interrupt input signal, and wherein the interrupt input signal is indicative of arrival of a random article having a dimension greater than the predicted dimension of the upcoming article.

* * * * *